(12) United States Patent
Nepsund et al.

(10) Patent No.: US 7,655,074 B2
(45) Date of Patent: Feb. 2, 2010

(54) FILTER ARRANGEMENTS; SIDE-ENTRY HOUSINGS; AND METHODS

(75) Inventors: Larry R. Nepsund, Savage, MN (US); Bradley A. Kuempel, Eden Prairie, MN (US); Donald F. Engel, Prior Lake, MN (US); Bruce Allen Boehrs, Minneapolis, MN (US); Sheldon Anderson, Bloomington, MN (US); Richard Bucholtz, Andover, MN (US); Steve Campbell, Lakeville, MN (US); Thomas John Lundgren, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 373 days.

(21) Appl. No.: 10/578,636

(22) PCT Filed: Nov. 10, 2004

(86) PCT No.: PCT/US2004/037570

§ 371 (c)(1),
(2), (4) Date: Feb. 23, 2007

(87) PCT Pub. No.: WO2005/046841

PCT Pub. Date: May 26, 2005

(65) Prior Publication Data

US 2007/0175194 A1  Aug. 2, 2007

Related U.S. Application Data

(60) Provisional application No. 60/519,574, filed on Nov. 12, 2003.

(51) Int. Cl.
*B01D 46/00* (2006.01)
(52) U.S. Cl. .......................... 95/273; 55/385.3; 55/480; 55/481; 55/502; 55/521; 55/DIG. 5

(58) Field of Classification Search .................. 55/480, 55/481, 493, 497, 498, 502, 504, 506, 521, 55/385.3, DIG. 5; 95/273
See application file for complete search history.

(56) References Cited

U.S. PATENT DOCUMENTS 991,572 A  5/1911  Weisenstein
(Continued)

FOREIGN PATENT DOCUMENTS

CA  997684  9/1976
(Continued)

OTHER PUBLICATIONS

Opposition filed Aug. 24, 2004 by Baldwin Filters, Inc. against European Patent 1 159 052 B1 owned by Donaldson Company, Inc.
(Continued)

*Primary Examiner*—Michael A Marcheschi
*Assistant Examiner*—Robert A Clemente
(74) *Attorney, Agent, or Firm*—Merchant & Gould P.C.

(57) ABSTRACT

An air cleaner (40) includes a housing (48) and an access cover. The internal volume of the housing (48) can be reached through an opening (70) in a side wall of the housing. A filter element (50) having fluted filter media is removable and replaceable from the air cleaner. The housing (48) is constructed and arranged to cam the element (50) into sealing engagement with the housing (48). The access cover includes structure to help support and ensure proper seating of the filter element within the housing. A method of installing the filter element in the air cleaner includes sliding a portion of the filter element against a slide surface in the housing. A method of servicing an air cleaner includes pushing the filter element against a pivot region in the housing to release a seal between the filter element and the housing.

24 Claims, 27 Drawing Sheets

U.S. PATENT DOCUMENTS

| | | | |
|---|---|---|---|
| 3,019,854 A | 2/1962 | O'Bryant | |
| 3,025,963 A | 3/1962 | Bauer | |
| 3,209,917 A | 10/1965 | Yelinek | |
| 3,442,067 A | 5/1969 | Swenson | |
| 3,494,113 A | 2/1970 | Kinney | |
| 3,676,242 A | 7/1972 | Prentice | |
| 3,695,437 A | 10/1972 | Shaltis | |
| 3,740,933 A | 6/1973 | Hollowell | |
| 3,807,150 A | 4/1974 | Maracle | |
| 3,841,953 A | 10/1974 | Kohkamp et al. | |
| 3,849,241 A | 11/1974 | Butin et al. | |
| 3,878,041 A | 4/1975 | Melead | |
| 3,912,631 A | 10/1975 | Turman | |
| 4,065,341 A | 12/1977 | Cub | |
| 4,159,899 A | 7/1979 | Deschenes | |
| 4,236,902 A | 12/1980 | Fricke | |
| 4,282,186 A | 8/1981 | Nonnenmann et al. | |
| 4,285,909 A | 8/1981 | Mizusawa et al. | |
| 4,295,434 A | 10/1981 | Hsiao | |
| 4,310,419 A | 1/1982 | Nara et al. | |
| 4,322,231 A | 3/1982 | Hilzendeger et al. | |
| 4,410,427 A | 10/1983 | Wydeven | |
| 4,449,993 A | 5/1984 | Bergeron | |
| 4,498,989 A | 2/1985 | Miyakawa et al. | |
| 4,578,091 A | 3/1986 | Borja | |
| 4,589,983 A | 5/1986 | Wydeven | |
| 4,617,176 A | 10/1986 | Merry | |
| 4,704,143 A | 11/1987 | Percy | |
| 4,720,292 A | 1/1988 | Engel et al. | |
| 4,759,783 A | 7/1988 | Machado | |
| 4,824,564 A | 4/1989 | Edwards et al. | |
| 4,925,469 A * | 5/1990 | Clement et al. | 55/480 |
| 4,925,561 A | 5/1990 | Ishii et al. | |
| 4,999,038 A | 3/1991 | Lundberg | |
| 5,030,264 A | 7/1991 | Klotz et al. | |
| 5,049,326 A | 9/1991 | Matsumoto et al. | |
| 5,082,476 A | 1/1992 | Kahlbaugh et al. | |
| 5,125,941 A | 6/1992 | Ernst et al. | |
| 5,174,895 A | 12/1992 | Drori | |
| 5,213,596 A | 5/1993 | Kume et al. | |
| 5,238,474 A | 8/1993 | Kahlbaugh et al. | |
| 5,304,312 A | 4/1994 | Forster et al. | |
| 5,350,515 A | 9/1994 | Stark et al. | |
| 5,415,677 A | 5/1995 | Ager et al. | |
| 5,435,870 A | 7/1995 | Takagaki et al. | |
| 5,472,463 A | 12/1995 | Herman et al. | |
| 5,484,466 A | 1/1996 | Brown et al. | |
| 5,487,767 A | 1/1996 | Brown | |
| 5,494,497 A | 2/1996 | Lee | |
| 5,543,007 A | 8/1996 | Takagaki et al. | |
| 5,547,480 A | 8/1996 | Coulonvaux | |
| 5,582,146 A | 12/1996 | Linsbauer et al. | |
| 5,611,922 A | 3/1997 | SteNe | |
| 5,613,992 A | 3/1997 | Engel | |
| 5,645,718 A | 7/1997 | Hardison et al. | |
| 5,672,399 A | 9/1997 | Kahlbaugh et al. | |
| 5,683,660 A | 11/1997 | Wirth et al. | |
| 5,685,985 A | 11/1997 | Brown et al. | |
| 5,690,712 A | 11/1997 | Engel | |
| 5,714,126 A | 2/1998 | Frund | |
| 5,730,766 A | 3/1998 | Clements | |
| 5,755,843 A | 5/1998 | Sundquist | |
| 5,772,883 A | 6/1998 | Rothman et al. | |
| D396,098 S | 7/1998 | Gillingham et al. | |
| 5,792,247 A | 8/1998 | Gillingham et al. | |
| D398,046 S | 9/1998 | Gillingham et al. | |
| 5,800,587 A | 9/1998 | Kahlbaugh et al. | |
| 5,820,646 A | 10/1998 | Gillingham et al. | |
| 5,863,313 A | 1/1999 | Coulonvaux | |
| 5,895,574 A | 4/1999 | Friedmann et al. | |
| 5,897,676 A | 4/1999 | Engel | |
| 5,902,364 A | 5/1999 | Tokar et al. | |
| 5,908,480 A | 6/1999 | Ban et al. | |
| D416,308 S | 11/1999 | Ward et al. | |
| D417,268 S | 11/1999 | Gillingham | |
| 6,048,386 A | 4/2000 | Gillingham et al. | |
| D425,189 S | 5/2000 | Gillingham et al. | |
| 6,149,700 A | 11/2000 | Morgan et al. | |
| 6,162,271 A | 12/2000 | Bullinger et al. | |
| 6,179,890 B1 | 1/2001 | Romas et al. | |
| 6,190,432 B1 * | 2/2001 | Gieseke et al. | 55/385.3 |
| 6,217,627 B1 * | 4/2001 | Vyskocil et al. | 55/492 |
| 6,231,630 B1 | 5/2001 | Ernst et al. | |
| 6,235,195 B1 | 5/2001 | Tokar | |
| 6,264,713 B1 | 7/2001 | Lewis | |
| 6,299,661 B1 | 10/2001 | Bloomer | |
| 6,306,192 B1 | 10/2001 | Greif et al. | |
| 6,322,602 B2 | 11/2001 | Engel et al. | |
| 6,348,084 B1 | 2/2002 | Gieseke et al. | |
| 6,348,085 B1 | 2/2002 | Tokar et al. | |
| 6,350,291 B1 | 2/2002 | Gieseke et al. | |
| D461,003 S | 7/2002 | Gieseke et al. | |
| 6,572,667 B1 | 6/2003 | Greif et al. | |
| 6,585,792 B2 | 7/2003 | Schneider et al. | |
| 6,598,580 B2 | 7/2003 | Baumann et al. | |
| 6,610,117 B2 | 8/2003 | Gieseke et al. | |
| 6,610,126 B2 | 8/2003 | Xu et al. | |
| D483,459 S | 12/2003 | DeWit et al. | |
| 6,743,317 B2 | 6/2004 | Wydeven | |
| 6,780,217 B1 | 8/2004 | Palmer | |
| 6,783,565 B2 | 8/2004 | Gieseke et al. | |
| 6,878,190 B1 | 4/2005 | Xu et al. | |
| 6,953,124 B2 | 10/2005 | Winter et al. | |
| 7,004,986 B2 | 2/2006 | Kopec et al. | |
| 7,147,685 B2 | 12/2006 | Lee | |
| 2001/0003893 A1 | 6/2001 | Ramos et al. | |
| 2001/0037631 A1 | 11/2001 | Morgan et al. | |
| 2002/0116909 A1 | 8/2002 | Onoda | |
| 2002/0185007 A1 | 12/2002 | Xu et al. | |
| 2004/0173097 A1 | 9/2004 | Engelland et al. | |
| 2004/0221555 A1 | 11/2004 | Engelland et al. | |
| 2005/0022669 A1 | 2/2005 | Xu et al. | |

FOREIGN PATENT DOCUMENTS

| | | |
|---|---|---|
| DE | 2155522 | 5/1993 |
| DE | 102 22 800 A1 | 12/2003 |
| EP | 0 095 416 | 5/1982 |
| EP | 0 080 659 | 11/1982 |
| EP | 0 376 443 A2 | 7/1990 |
| EP | 0 486 276 A1 | 5/1992 |
| EP | 0 492 250 A1 | 7/1992 |
| EP | 0 529 921 A1 | 3/1993 |
| EP | 0 581 695 A1 | 2/1994 |
| EP | 0 704 233 A1 | 4/1996 |
| EP | 0 726 389 A1 | 8/1996 |
| EP | 0 738 528 A2 | 10/1996 |
| EP | 1 159 052 B1 | 11/2003 |
| EP | 1 364 695 A1 | 11/2003 |
| FR | 1 081 179 | 6/1954 |
| GB | 703 823 | 2/1954 |
| GB | 1 275 651 | 5/1972 |
| GB | 1 495 745 | 12/1977 |
| JP | S58-151417 | 3/1982 |
| JP | 59-26113 | 2/1984 |
| JP | S60-155921 | 3/1984 |
| JP | 59-170669 | 9/1984 |
| JP | 59-170669 | 11/1984 |
| JP | H02-48118 | 9/1988 |
| JP | 1-11971 | 1/1989 |
| JP | 0117165 | 6/1989 |
| JP | 01 171615 A | 10/1989 |
| JP | 63-122617 | 6/1998 |
| JP | H02-48117 | 9/1998 |

| | | |
|---|---|---|
| WO | 88/03432 | 5/1988 |
| WO | WO 88/03431 | 5/1988 |
| WO | 97/40908 | 11/1997 |
| WO | 97/40910 | 11/1997 |
| WO | 97/40917 | 11/1997 |
| WO | WO 97/40908 | 11/1997 |
| WO | WO 97/41939 | 11/1997 |
| WO | WO97/45200 | 12/1997 |
| WO | WO 98/35144 | 8/1998 |
| WO | WO 99/37381 | 7/1999 |
| WO | WO 99/47237 | 9/1999 |
| WO | WO 00/50149 | 8/2000 |
| WO | WO 00/74818 | 12/2000 |
| WO | WO 02/49741 A1 | 6/2002 |
| WO | 03/095068 | 11/2003 |

OTHER PUBLICATIONS

Decision Revoking European Patent No. 1 159 052., Apr. 13, 2006.
Declaration of Tom Miller, submitted in U.S. Appl. No. 12/135,742, Jun. 11, 2009.
Response to the Notice of Opposition (filed by Donaldson Company, Mar. 31, 2005).
File History of U.S. Appl. No. 10/776,303, filed Feb. 10, 2004.
File History of U.S. Appl. No. 10/776,662, filed Feb. 10, 2004.
European Search Report mailed on Mar. 16, 2007.
English Translation of Opposition Brief of Wittner & Muller against EP1509311 by Opposer Mann & Hummel GmbH, dated Oct. 5, 2007, filed in European Patent Office.

* cited by examiner

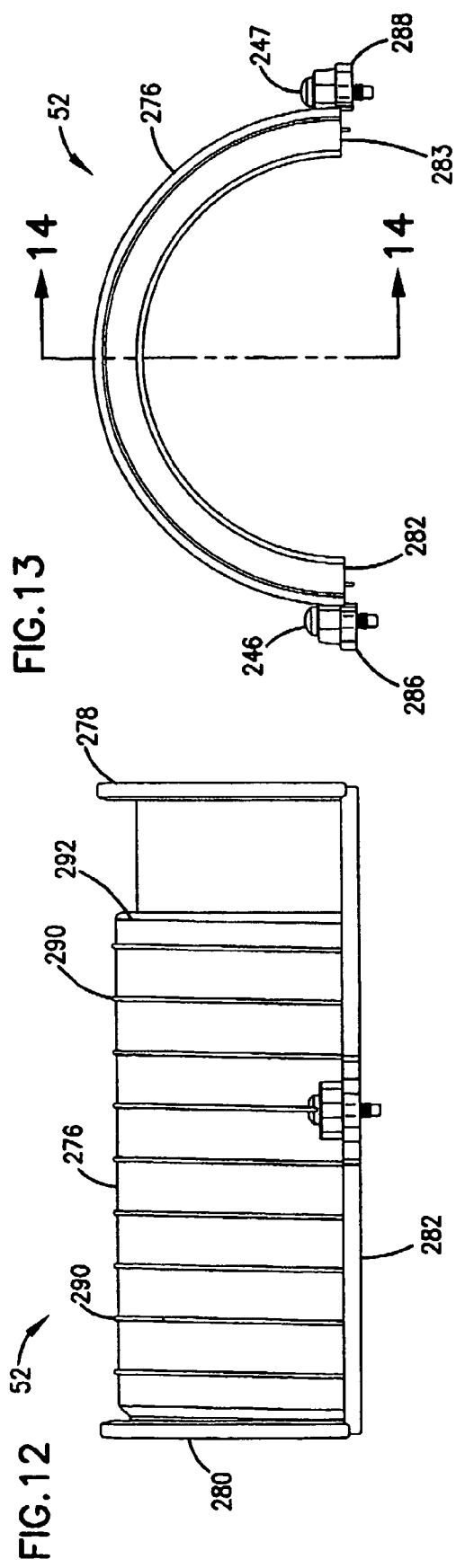
FIG.13
FIG.12
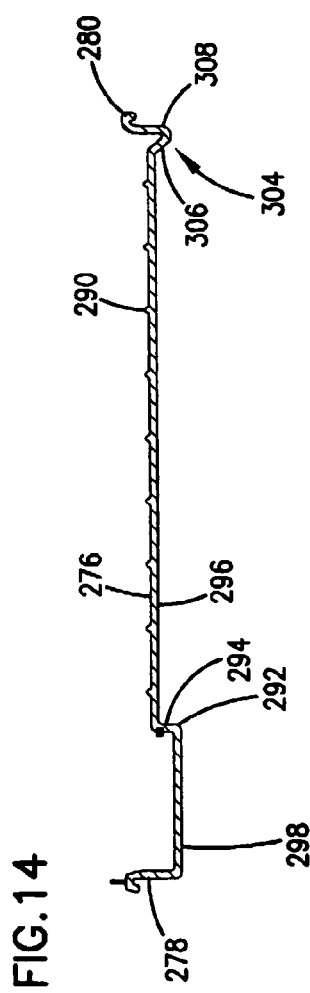
FIG.14

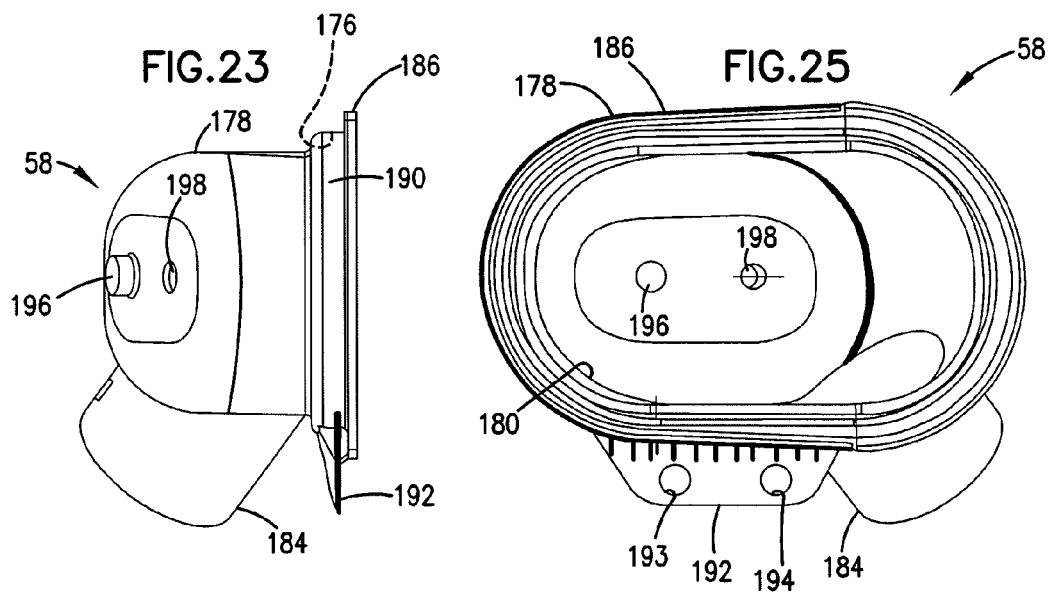
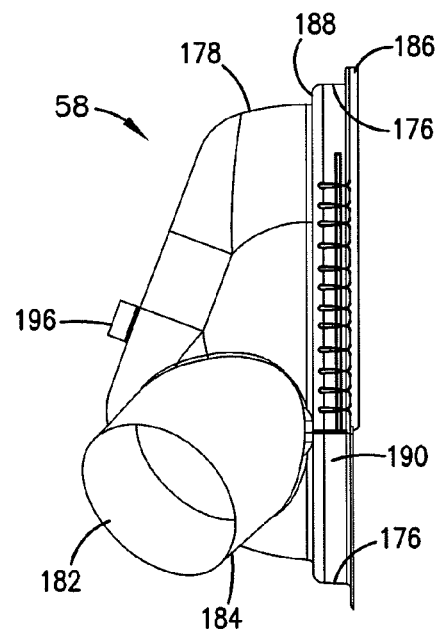
FIG.23
FIG.25
FIG.24

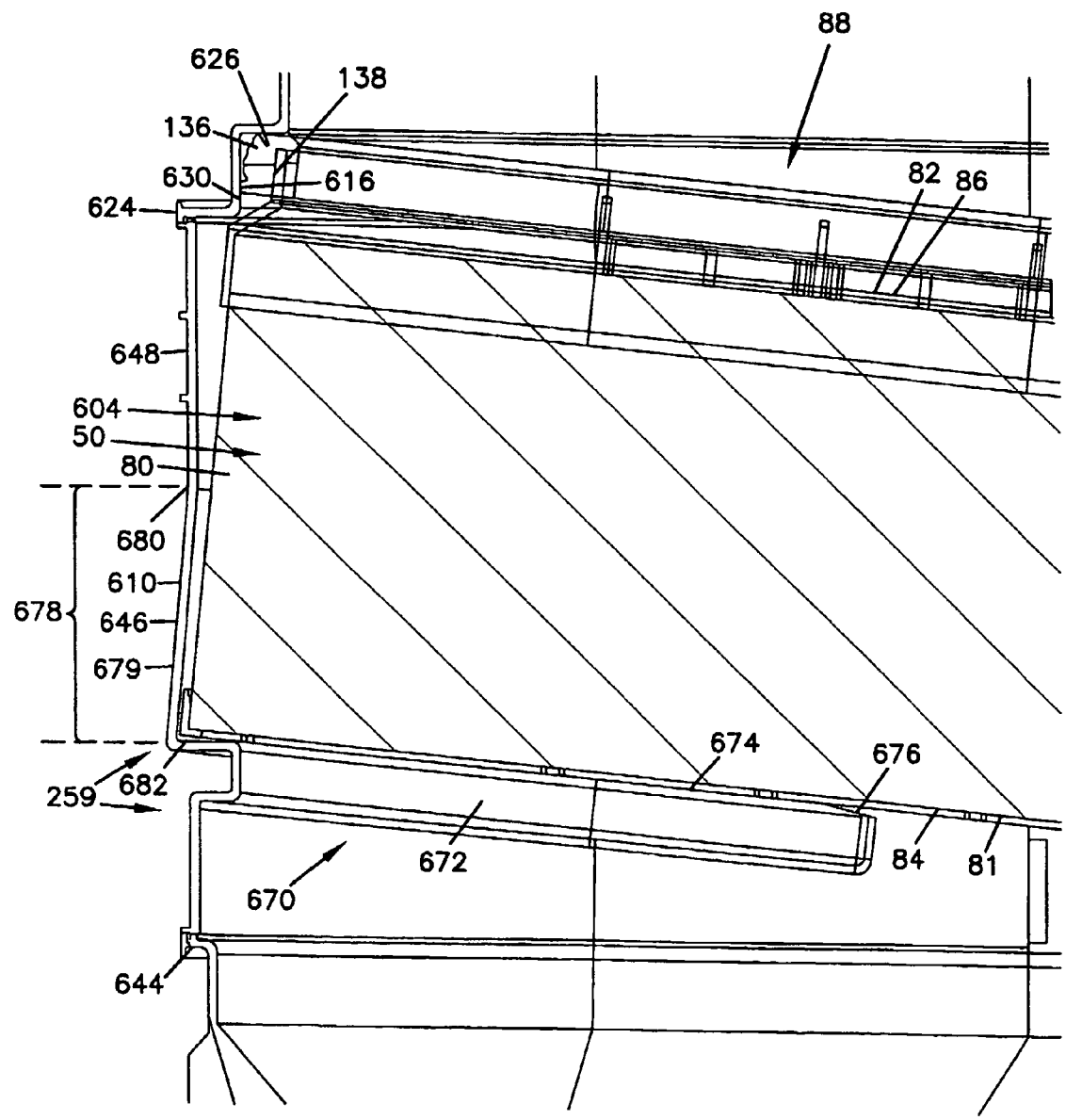

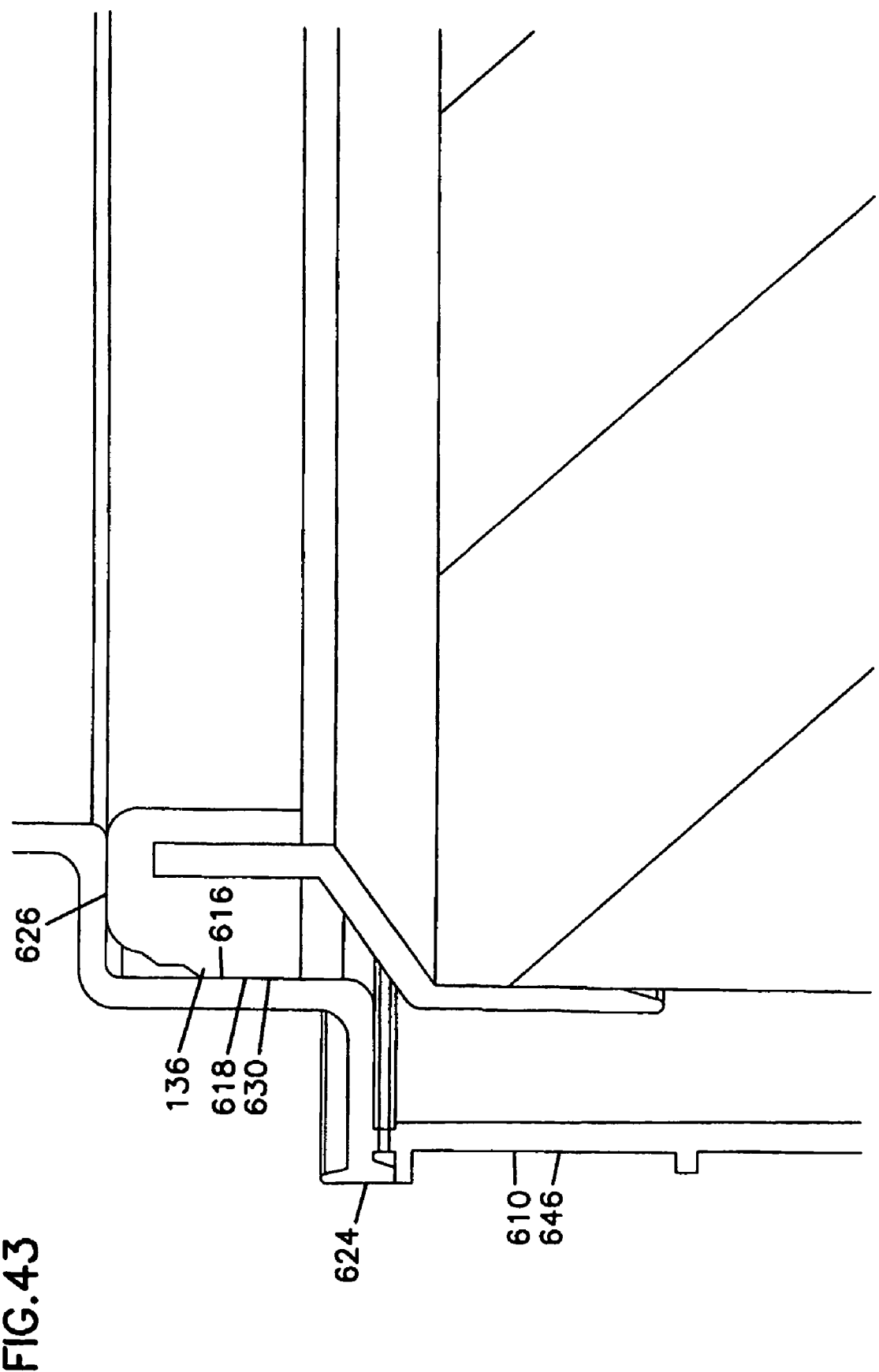

US 7,655,074 B2

FILTER ARRANGEMENTS; SIDE-ENTRY HOUSINGS; AND METHODS

TECHNICAL FIELD

This disclosure concerns filter constructions for engines and methods of filtering and filter preparation. In particular, the disclosure describes Z-filter arrangements and side entry housings.

BACKGROUND

Gas streams often carry particulate material therein. In many instances, it is desirable to remove some or all of the particulate material from a gas flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. It is therefore preferred, for such systems, to remove the particulate material from the gas flow upstream of the engine, turbine, furnace or other equipment involved. A variety of air filter or gas filter arrangements have been developed for particulate removal. In general, however, continued improvements are sought.

SUMMARY OF THE DISCLOSURE

An air cleaner includes a housing having first and second opposite ends and a sidewall between the first and second ends; the sidewall defining an access opening. The sidewall has a slide mount. An access cover is removably positioned over the access opening. A filter element is operably installed and sealed in the housing. The filter element has first and second opposite flow faces. The filter element includes media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion. The housing is constructed and arranged to accept the filter element through the access opening in the sidewall and slide along the slide mount. The air cleaner is characterized by the sidewall defining a bump out region. The bump out region is a wedge-shaped area of volume defined by the sidewall expanding outwardly until reaching the slide mount. The housing is constructed and arranged to accept the filter element through the access opening in the sidewall, slide along the slide mount, and engage the bump out region.

A method of servicing an air cleaner in which the air cleaner includes: a housing having first and second opposite ends and a sidewall between the first and second ends; the sidewall defining an access opening; an access cover removably positioned over the access opening; and a filter element operably installed and sealed in the housing. The filter element has first and second opposite flow faces and includes media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion. The housing is constructed and arranged to accept the filter element through the access opening in the sidewall. The method includes pushing the filter element against a pivot region in the housing to pivot the filter element about the pivot region and release a seal between the filter element and the housing.

A method of installing a filter element into an air cleaner, in which the air cleaner includes a housing having first and second opposite ends and a sidewall between the first and second ends; the sidewall defining an access opening; the sidewall defining a ramp; an access cover removably positioned over the access opening. The filter element includes first and second opposite flow faces, media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion. The filter element has a band around the periphery of the first flow face. The housing is constructed and arranged to accept the filter element through the access opening in the sidewall. The method includes engaging the band against the ramp and sliding the filter element along the ramp. The method is characterized by sliding the filter element with the band into a bump out region; contacting a seal member on the filter element against a pivot region on the housing; and applying force to an exposed portion of the filter element and pivoting the element about the pivot region to move the seal member into sealing engagement with the housing.

BRIEF DESCRIPTION OF THE DRAWINGS

FIG. 12 is a side elevational view of the housing cover used with the air cleaner of FIGS. 2, 3, and 9-11;

FIG. 13 is an end elevational view of the housing cover depicted in FIG. 12;

FIG. 14 is a cross-sectional view of the housing cover, the cross-section being taken along the line 14-14 of FIG. 13;

FIG. 23 is a side elevational view of the outlet construction used with the air cleaner housing of FIGS. 2, 3, and 9-13;

FIG. 24 is a rear elevational view of the outlet construction depicted in FIG. 23;

FIG. 25 is a right end view of the outlet construction depicted in FIG. 23;

FIG. 37 is a schematic, partial, cross-sectional view showing one step of installing a filter element into the air cleaner housing of FIGS. 30-36;

FIG. 43 is a fragmented, cross-sectional view showing a portion of the filter element operably installed in the housing.

DETAILED DESCRIPTION

A. Example System and Overview of the Air Cleaner

Figure 1:
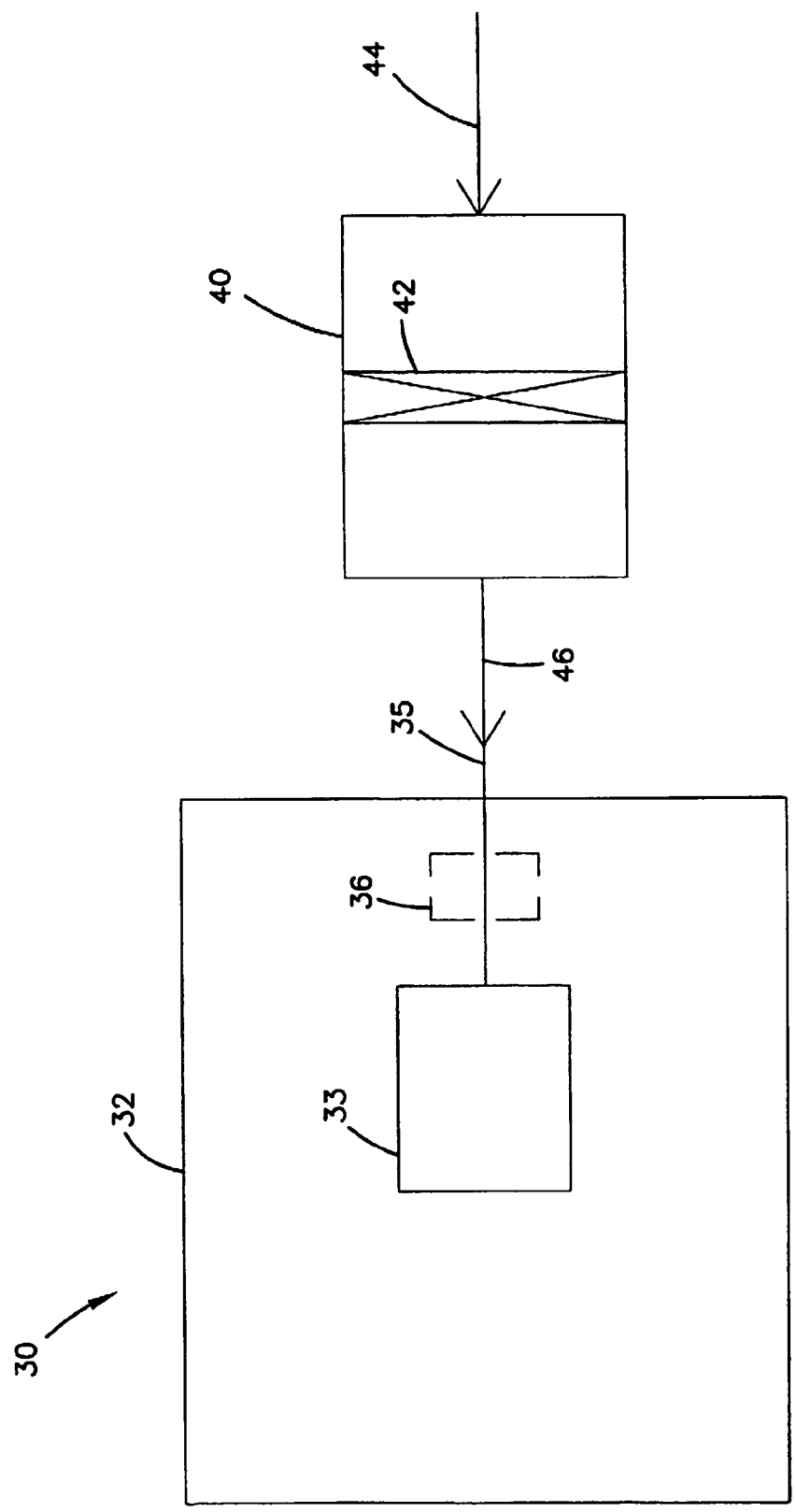
FIG. 1 is a schematic view of one embodiment of a system in which air cleaners according to the present disclosure are used.

Filter constructions and arrangements described herein are usable in a variety of systems. One particular type of system is depicted schematically in FIG. 1 generally at 30. In FIG. 1, equipment 32, such as a vehicle, having an engine 33 with some defined rated air flow demand, for example at least 50 cfm and up to 1800 cfm, is shown schematically. The equipment 32 may comprise a bus, an over-the-highway truck, an off-road vehicle, a tractor, a light-duty or medium duty truck, or a marine application such as a powerboat. The engine 33 powers the equipment 32, through use of an air and fuel mixture. In FIG. 1, air flow is shown drawn into the engine 33 at an intake region 35. An optional turbo 36 is shown in phantom, as optionally boosting the air intake into the engine 33. An air cleaner 40 having a filter construction 42 is upstream of the engine 33 and the turbo 36. In general, in operation, air is drawn in at arrow 44 into the air cleaner 40 and through the filter construction 42. There, particles and contaminants are removed from the air. The cleaned air flows downstream at arrow 46 into the intake 35. From there, the air flows into the engine 33 to power the equipment 32.

Figure 2:
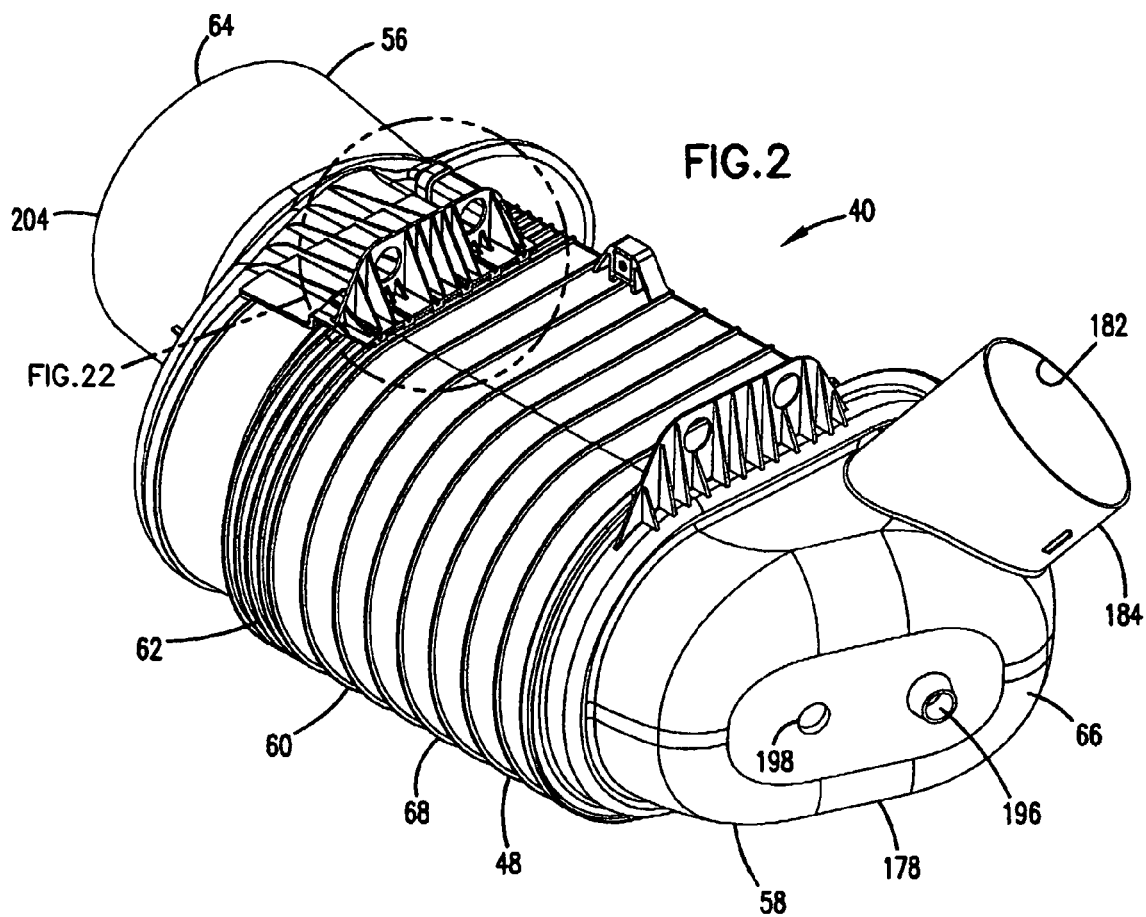
FIG. 2 is a perspective view of one embodiment of an air cleaner including a housing with a removable and replaceable filter element installed therein.
Figure 3:
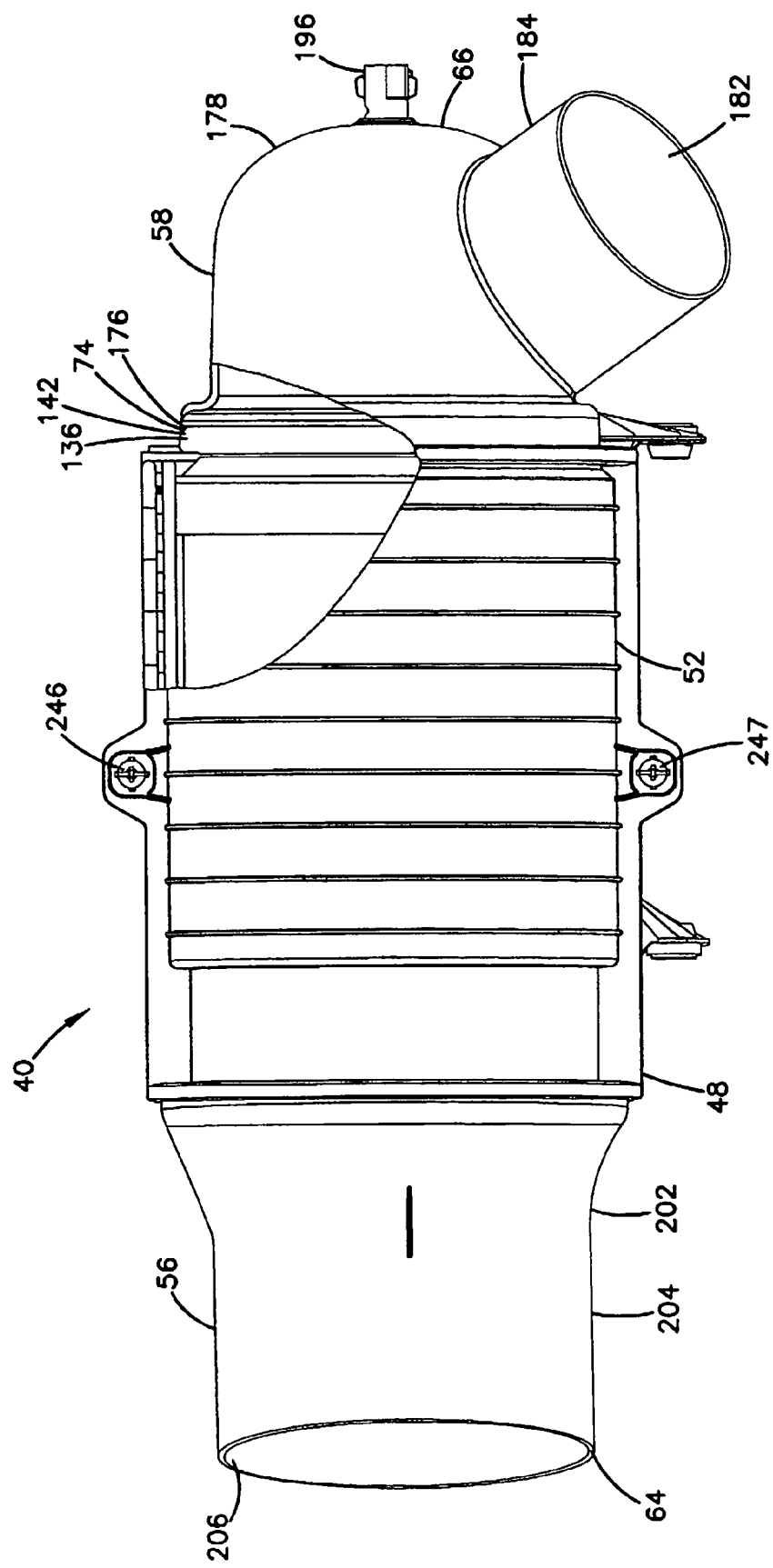
FIG. 3 is a side elevational view of the air cleaner depicted in FIG. 2, with a portion of the housing broken away to show the filter element operably installed therein.

One embodiment of air cleaner 40 is shown now in FIGS. 2 and 3. In general, the air cleaner 40 includes a housing 48 with a removable and replaceable filter element 50. In preferred constructions, the housing 48 has a removable service cover 52. The service cover 52 allows access to an internal volume 54 of the housing 48 to permit servicing of the air cleaner 40. Servicing of the air cleaner 40 includes removal of the filter element 50 and installation and replacement of a new filter element 50 in the housing 48.

The housing 48 includes an inlet construction 56, an outlet construction 58, and a body member 60. In the preferred embodiment, the inlet construction 56, outlet construction 58, and body member 60 comprise a body construction 62. The cover 52 is removable and replaceable from the body construction 62. In the particular preferred embodiment illustrated, the cover 52 is removable from the body member 60.

Figure 8:
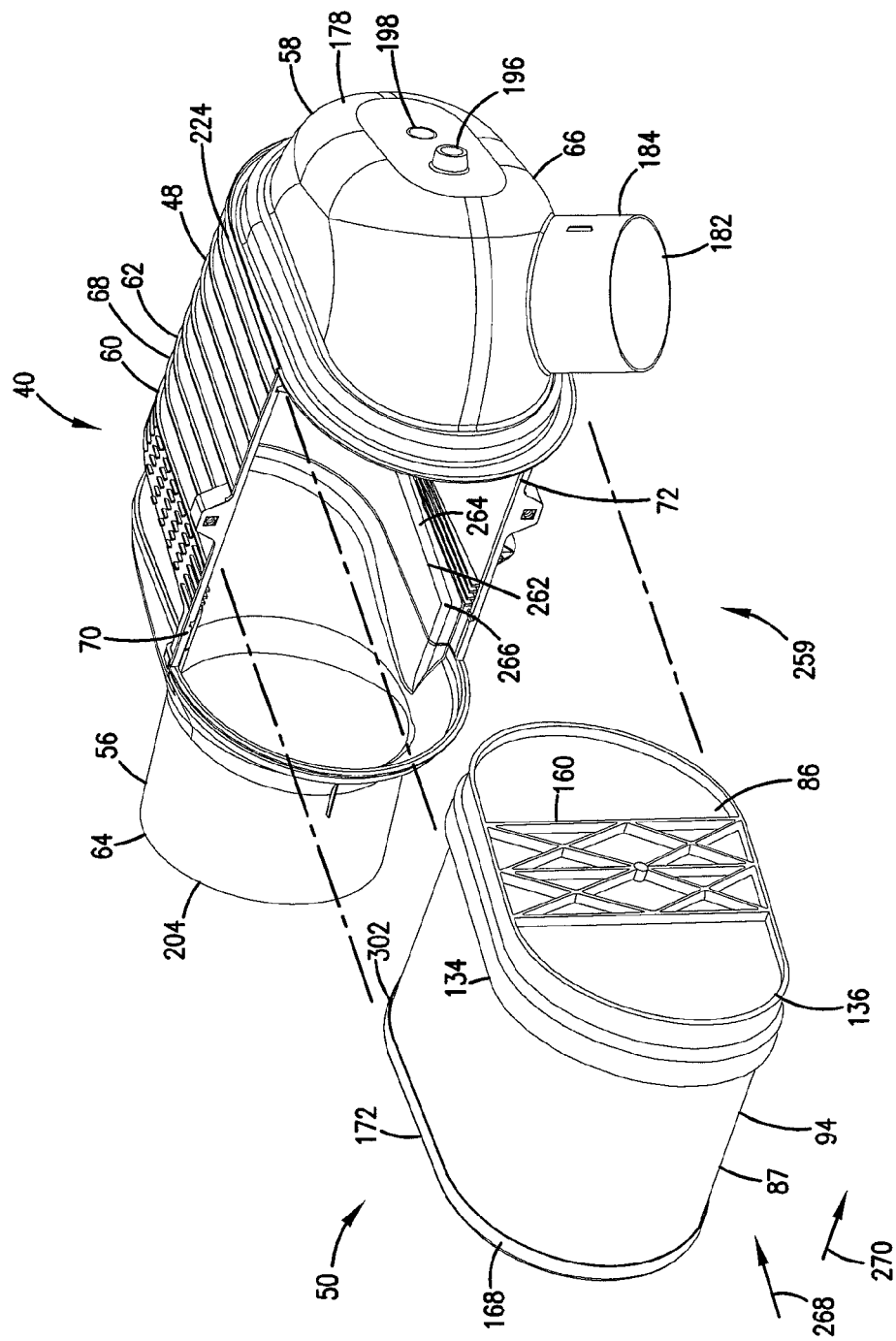
FIG. 8 is a perspective view of the air cleaner housing of FIGS. 2 and 3 with the service cover removed and with the filter element oriented for installation therein.

In application, the inlet construction 56 forms an inlet end 64 to the housing 48, while the outlet construction 58 forms an outlet end 66 for the housing 48. The body member 60 comprises a side wall 68 extending between the inlet construction 56 and the outlet construction 58. The cover 52 is removable from the body member 60 to provide an access opening 70 (FIG. 8) in the housing 48. The access opening 70 provides for a side entry 72 (FIG. 8) into the air cleaner 40.

In FIG. 3, the cover 52 is partially broken away to show the filter element 50 operably installed therein. By "operably installed" or variants thereof, it is meant that the filter element is oriented in the housing 48 such that there can be normal operation of the air cleaner 40 with air passing through the inlet construction 56, through the filter element 50, and out through the outlet construction 58. When operably assembled within the housing 48, the filter element 50 forms a seal 74 with the housing 48. In the particular embodiment shown, the seal 74 is formed with the outlet construction 58.

With that overview, we now turn to the various air cleaner components.

B. Filter Elements

1. Example Filter Element 50

A variety of filter elements may be used in accordance with this disclosure, including elements with depth media, tubular elements with pleated media, etc. One useable filter element 50 includes the types of filter elements described in U.S. Pat. No. 6,350,291 to Gieseke et al., incorporated by reference herein. With the exception of an additional band on the filter element 50 in this application, preferred elements are designated in accordance with the principles described in U.S. Pat. No. 6,350,291. In the embodiment shown, the filter element 50 is a filter element that allows for straight-through air flow. The particular illustrated embodiment utilizes fluted or Z-media 80.

Figure 5:
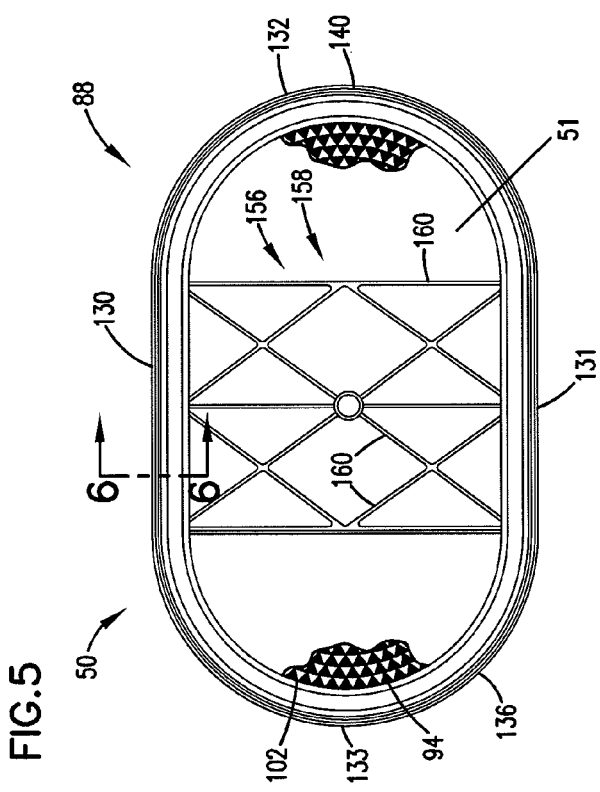
FIG. 5 is a top plan view of the filter element depicted in FIG. 4, the media being depicted schematically.
Figure 4:
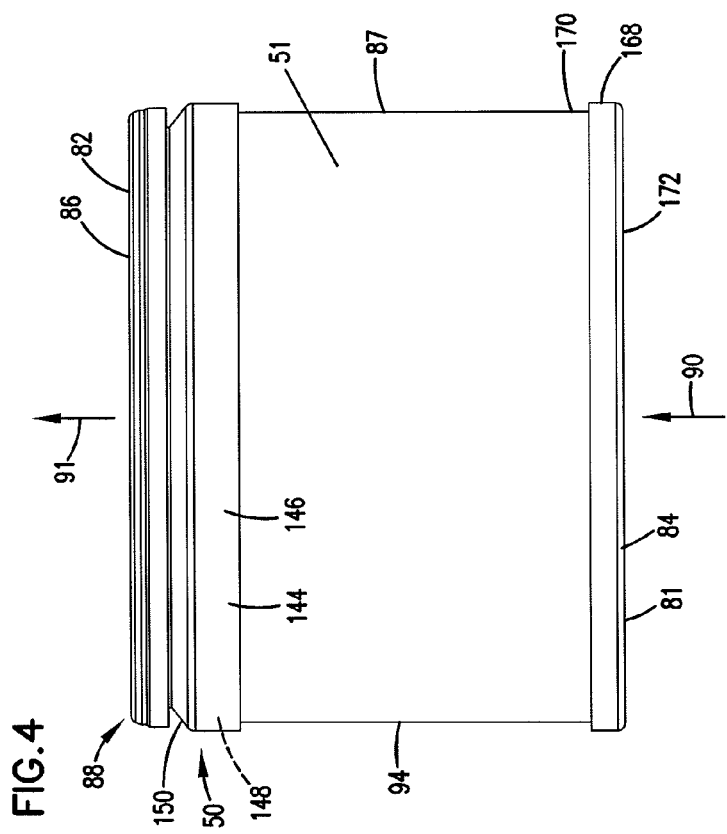
FIG. 4 is a side elevational view of one embodiment of a filter element useable with the air cleaner depicted in FIGS. 2 and 3.

In reference now to FIGS. 4 and 5, the filter element 50 shown includes a media pack 51 having first and second opposite ends 81, 82. At the first end, there is defined a first flow face 84, while the second 82 defines a second flow face 86. In the example shown, the first flow face 84 corresponds to an inlet end, while the second flow face 86 corresponds to an outlet end. The filter element 50 also includes a sealing system 88. In the preferred embodiment, the filter media 80 removes particulates from fluid, such as air, passing through the filter media 80, while the sealing system 88 seals the element 50 against the housing 48. By the term "seal", it is meant that the sealing system 88, under normal conditions, prevents fluid from passing through a region between the media 80 and the housing 48; i.e., the sealing system 88 forces fluid to flow through the filter media 80 instead of bypass it.

The filter media 80 is configured for straight-through flow. That is, fluid to be filtered enters in one direction 90 through the first flow face 84 and exits in the same direction 91 from the second flow face 86. The filter media 80 is also referenced herein as "z-media."

In the particular embodiment illustrated, the first flow face 84 and the second flow face 86 are depicted as planar and parallel. In other embodiments, the first flow face 84 and the second flow face 86 can be non-planar, for example, frusto-conical. Further, the first flow face 84 and the second flow face 86 can be slanted and not parallel to each other.

Generally, the filter element 50 will be a wound construction 87. That is, the construction 50 will typically include a layer of filter media that is turned completely or repeatedly about a center point. Typically, the wound construction 87 will be a coil, in that a layer of filter media will be rolled a series of turns around a center point. In arrangements where a wound, coiled construction is used, the filter element 50 will be a roll of filter media, typically permeable fluted filter media In other implementations, the construction 50 is a stacked configuration.

Figure 7:
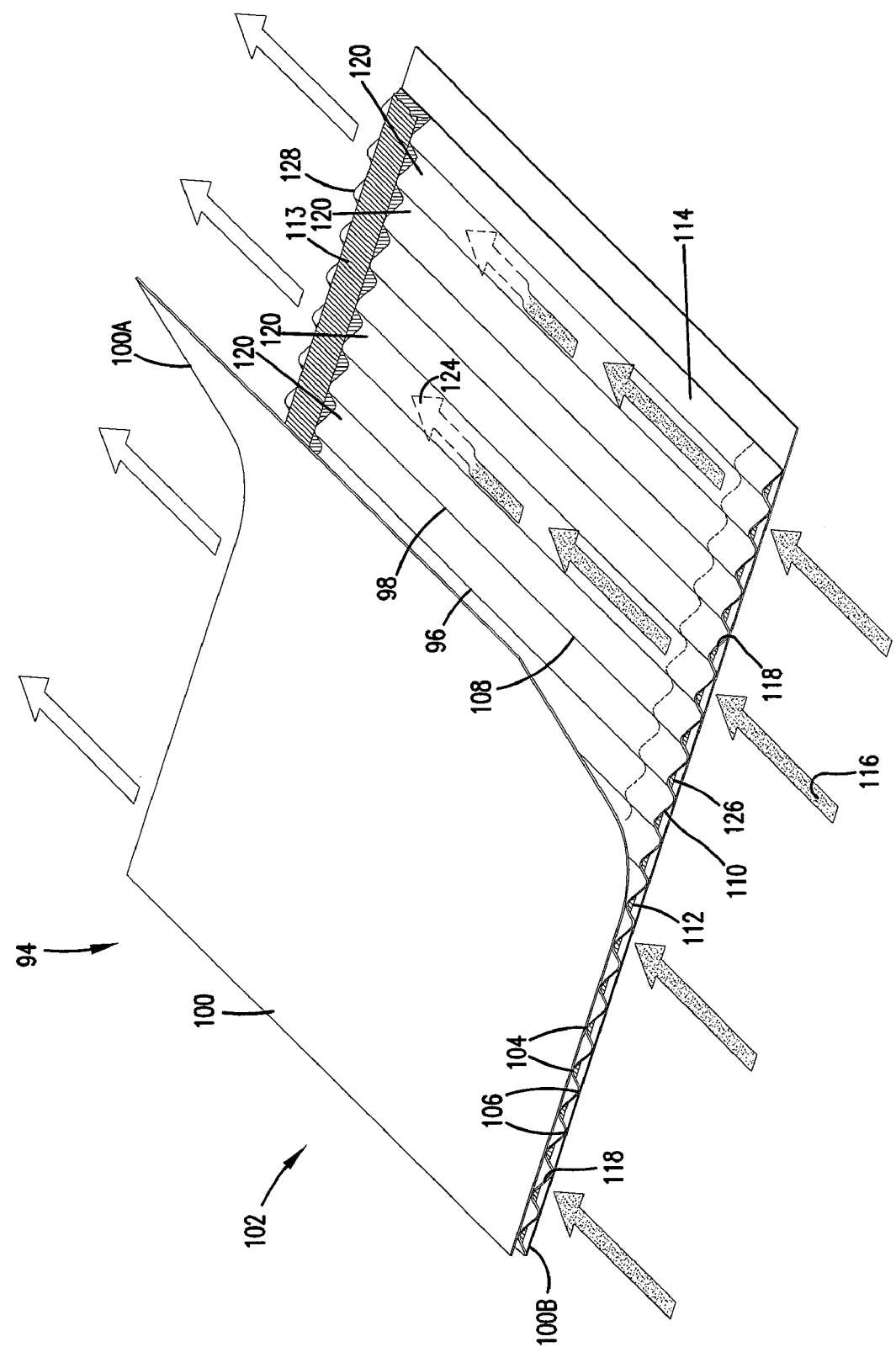
FIG. 7 is a schematic, perspective view of a portion of filter media useable in the filter element depicted in FIGS. 4 and 5.

Attention is now directed to FIG. 7. FIG. 7 is schematic, perspective view demonstrating the principles of operation of certain preferred media usable in the filter constructions herein. In FIG. 7, a fluted construction is generally designated at 94. Preferably, the fluted construction 94 includes: a layer 96 of corrugations having a plurality of flutes 98 and a face sheet 100. The FIG. 7 embodiment shows two sections of the face sheet 100, at 100A (depicted on top of the corrugated layer 96) and at 100B (depicted below the corrugated layer 96). Typically, the preferred media construction 102 used in arrangements described herein will include the corrugated layer 96 secured to the bottom face sheet 100B. When using this media construction 102 in a rolled construction, it typically will be wound around itself, such that the bottom face sheet 100B will cover the top of the corrugated layer 96. The face sheet 100 covering the top of the corrugated layer is depicted as 100A. It should be understood that the face sheet 100A and 100B are the same sheet 100.

When using this type of media construction 102, the flute chambers 98 preferably form alternating peaks 104 and troughs 106. The troughs 106 and peaks 104 divide the flutes into an upper row and lower row. In the particular configuration shown in FIG. 7, the upper flutes form flute chambers 108 closed at the downstream end, while flute chambers 110 having their upstream end closed form the lower row of flutes. The fluted chambers 110 are closed by a first end bead 112 that fills a portion of the upstream end of the flute between the fluting sheet 114 and the second facing sheet 100B. Similarly, a second end bead 113 closes the downstream end of alternating flutes 108.

When using media constructed in the form of media construction 102, during use, unfiltered fluid, such as air, enters the flute chambers 108 as indicated by the shaded arrows 116. The flute chambers 108 have their upstream ends 118 open. The unfiltered fluid flow is not permitted to pass through the downstream ends 120 of the flute chambers 108 because their downstream ends 120 are closed by the second end bead 113. Therefore, the fluid is forced to proceed through the fluting sheet 114 or face sheets 100. As the unfiltered fluid passes through the fluting sheet 114 or face sheets 100, the fluid is cleaned or filtered. The cleaned fluid is indicated by the unshaded arrow 124. The fluid then passes through the flute chambers 110 (which have their upstream ends 126 closed) to flow through the open downstream end 128 out the fluted construction 94. With the configuration shown, the unfiltered fluid can flow through the fluted sheet 114, the upper facing sheet 1OOA, or lower facing sheet 1OOB, and into a flute chamber 110.

A variety of ways can be used to coil or roll the media. In some preferred embodiments, the media construction 102 is wound about a center mandrel, which may be removed or left to plug to act as a core at the center of the filter element 50. It can be appreciated that non-round center winding members may be utilized for making filtering media shapes, such as filter media having an oblong, oval, rectangular, or racetrack-shaped profile. The media construction 102 can also be wound without a mandrel or center core. One process for making a coreless element 50 is described in U.S. Pat. No. 6,416,605, which is incorporated by reference herein.

While the flutes 98 depicted are shown as straight flutes, in other embodiments, it may be desired to have tapered flutes. Examples of tapered flutes are described in WO 97/40918, published 6 Nov. 1997, incorporated herein by reference. Further, in some embodiments, the flutes can have deformed ends. Flutes with deformed ends are described in WO 97/40918, incorporated herein by reference.

In reference now to FIG. 5, a top plan view of the filter element 50 is shown. As can be seen in FIG. 5, the filter element 50 is a non-cylindrical construction. In particular, the filter element 50 has a race track configuration with a pair of parallel sides 130, 131 joined by a pair of arced or curved ends 132, 133. The flow face 86 is shown schematically; it should be understood that the entire flow face 86 will show the end of the media 102.

Still in reference to FIG. 4, the sealing system 88 includes a frame construction 134 and a seal member 136. The frame construction 134 provides a support structure or backing against which the seal member 136 can be compressed against to form seal 74 with the housing 48.

Figure 6:
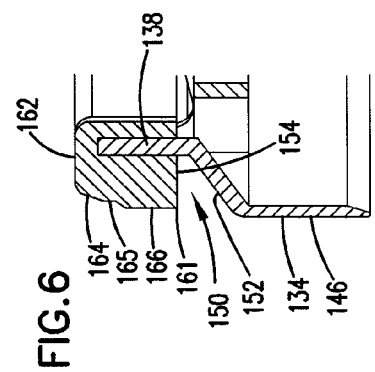
FIG. 6 is a fragmented, cross-sectional view showing a portion of the filter element, the cross-section being taken along the line 6-6 of FIG. 5.

In the example shown in FIG. 6, the frame construction 134 includes a rigid projection 138 that projects or extends from at least a portion of the second flow face 86. In particular, the projection 138 extends axially from the second flow face 86. The projection 138 provides a support or backing to the seal member 136 such that seal 74 can be formed between and against the projection 138 and a sealing surface on the housing 48. When this type of construction is used, the projection 138 is a continuous member forming a closed ring 140. The seal member 136, in the one shown, engages an exterior portion of the ring 140. When this type of construction is used, the housing 48 circumscribes the projection 138 including the seal member 136 to form seal 74 between and against the projection 138 and the housing 48. In particular, the seal 74 is a radially directed seal 142 (FIG. 3).

Still in reference to FIGS. 4-6, the frame construction 134 includes a frame 144 that has a band, skirt, or depending lip 146. Preferably, an inside dimension of the depending lip 146 is approximately equal to the outside dimension of the wound filter construction 87. The depending lip 146 extends radially around the second flow face 86 of the filter construction 87. In particular, the lip 146 is secured to an outer periphery or outer annular portion 148 adjacent to the second flow face 86.

The filter element 50 defines an annular recess 150. In the preferred embodiment shown, the recess 150 is defined by a portion of the frame construction 134. In particular, the recess 150 is defined by an angled member 152 extending between the lip 146 and the projection 138. An end surface 154 of the seal member 136 also defines a portion of the recess 150. As explained below, the recess 150 receives a projection from the housing 48 to help stabilize the filter element 50 within the housing 48.

The frame 144 also preferably includes cross braces 156. Cross braces 156 support the frame 144 by helping to prevent the frame 144 from radially collapsing under the forces exerted around the circumference of the, frame 144. The cross braces 156 depicted form a truss system 158 including a plurality of rigid struts 160, preferably molded as a single piece with remaining portions of the frame 144.

Attention is directed to FIG. 6. FIG. 6 is an enlarged, fragmented view of a particular preferred seal member 136 in an uncompressed state. In the embodiment shown, the seal member 136 is a stepped cross-sectional configuration of decreasing outermost dimensions from the first end 161 to a second end 162 to achieve desirable sealing. Preferred specifications for the seal member 136 include a polyurethane foam material having a plurality of (preferably, at least three) progressively larger steps configured to interface with the housing 48 to provide a fluid-tight seal. In the example shown, the seal member 136 defines three steps 164, 165, 166. The cross-sectional dimension or width of the steps 164, 165, 166 increases the further the step is from the second end 162 of the seal member 136. The small dimension at the second end 162 allows for easy insertion into the housing 48. The larger dimension at the first end 161 insures a tight seal.

Figure 26:
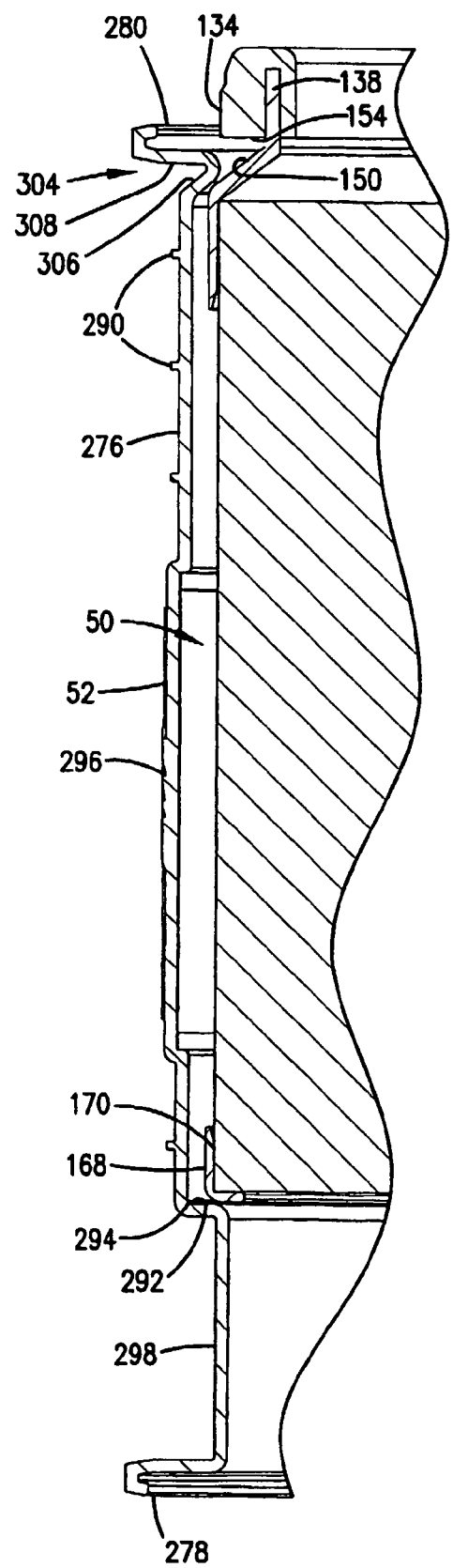
FIG. 26 is a schematic, fragmented, side elevational view showing the filter element interacting with the housing cover.

In reference again to FIG. 4, the filter element 50 further includes a frame or band 168 circumscribing the wound filter construction 87. Preferably, the band 168 is secured to the outer annular portion 148 of the element 50. In preferred embodiments, the band 168 is secured to the outer periphery 170 adjacent to the first flow face 84. The band 168 helps to provide a slide surface 172 for mounting the filter element 50 within the housing 48. Further, the band 168 helps to provide structure for stabilizing and supporting the filter element 50 when operably mounted in the housing 48. This can be seen in FIG. 26, for example. In FIG. 26, it can be seen how the band 168 engages the cover 52. This is explained further below.

2. Example Filter Element 500

Figure 29:
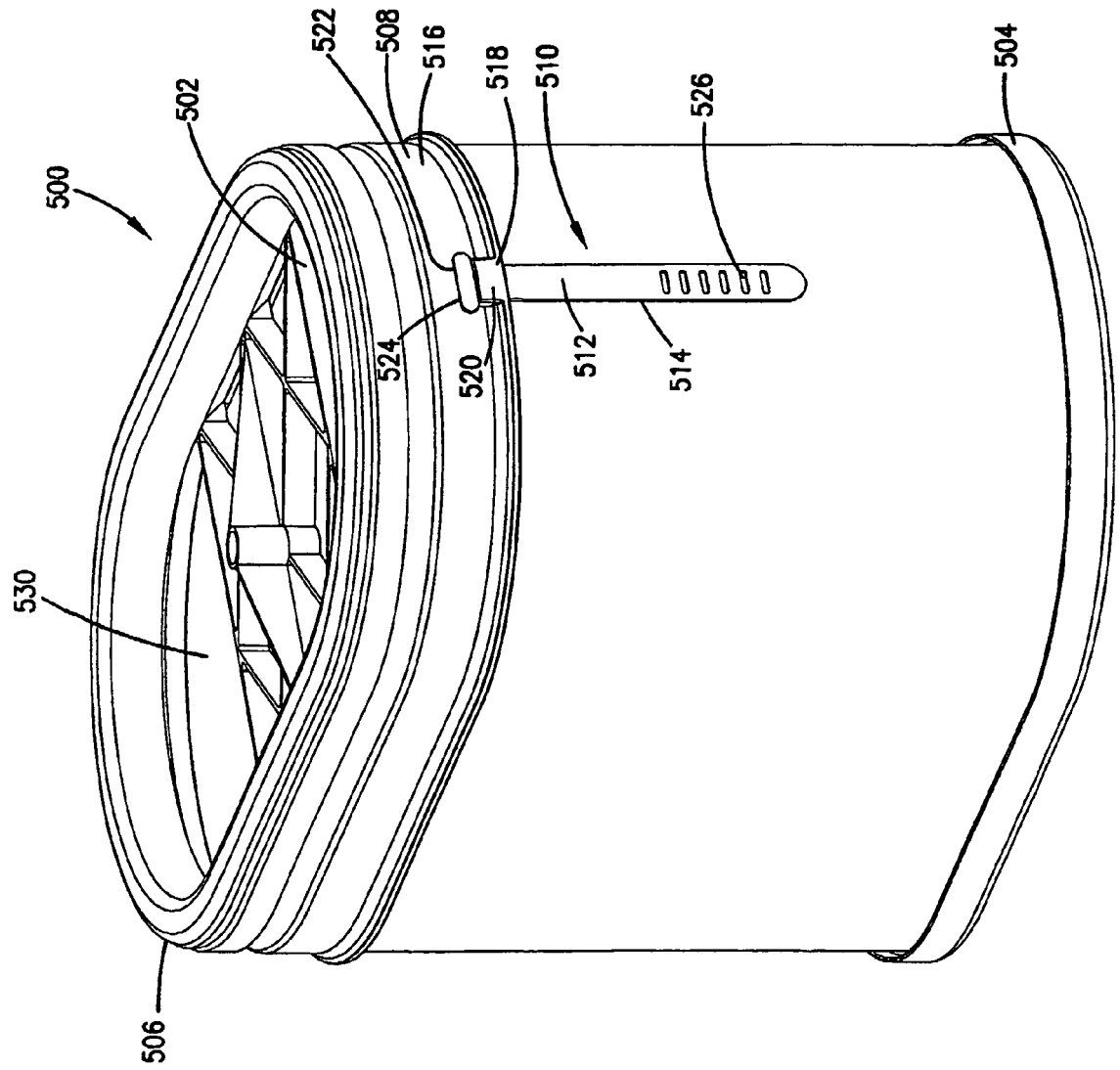
FIG. 29 is a perspective view of another embodiment of a filter element usable in the air cleaner of FIGS. 2, 3, and 8-28.
Figure 30:
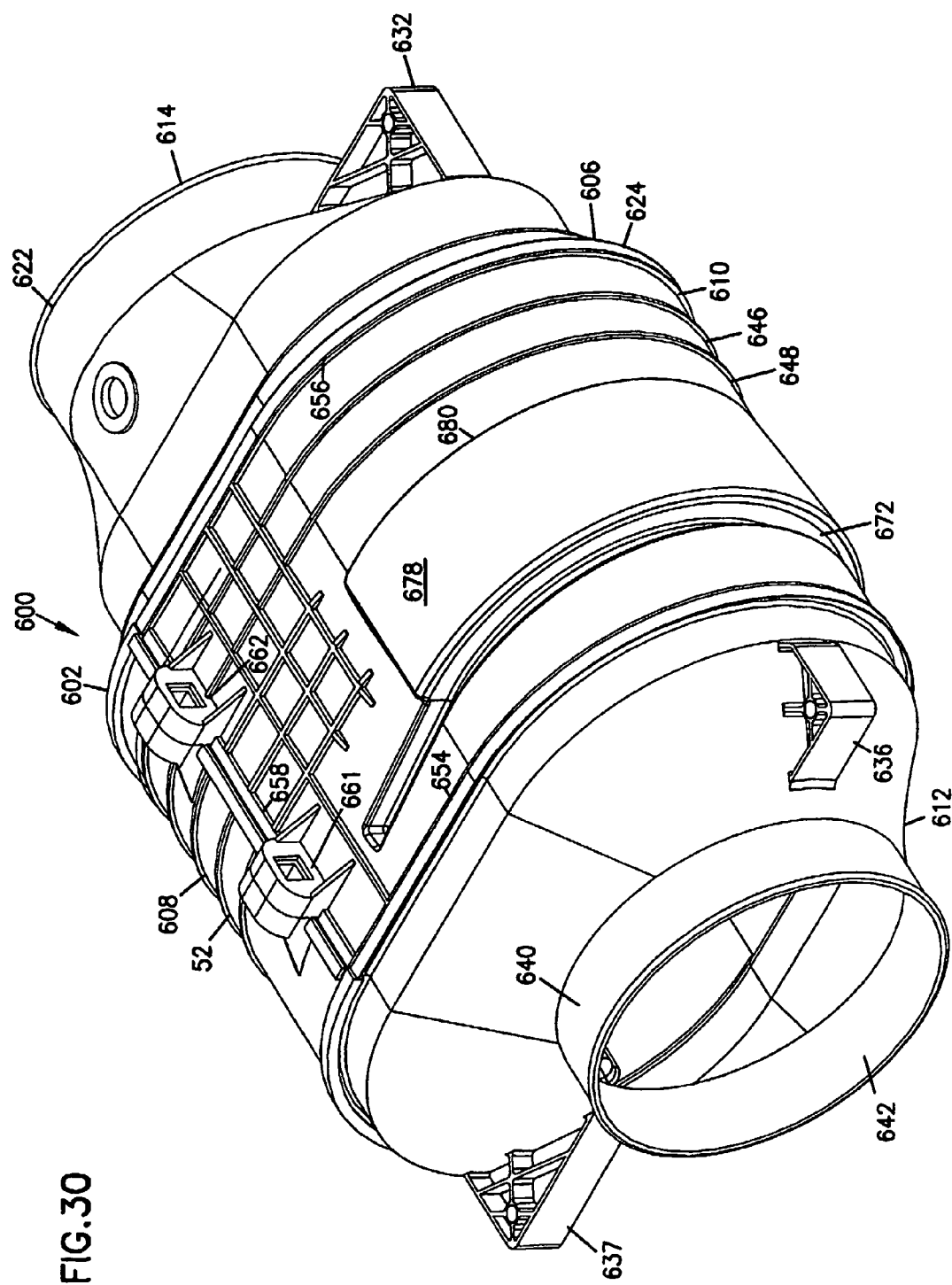
FIG. 30 is a perspective view of another embodiment of an air cleaner constructed according to principles of this disclosure.
Figure 31:
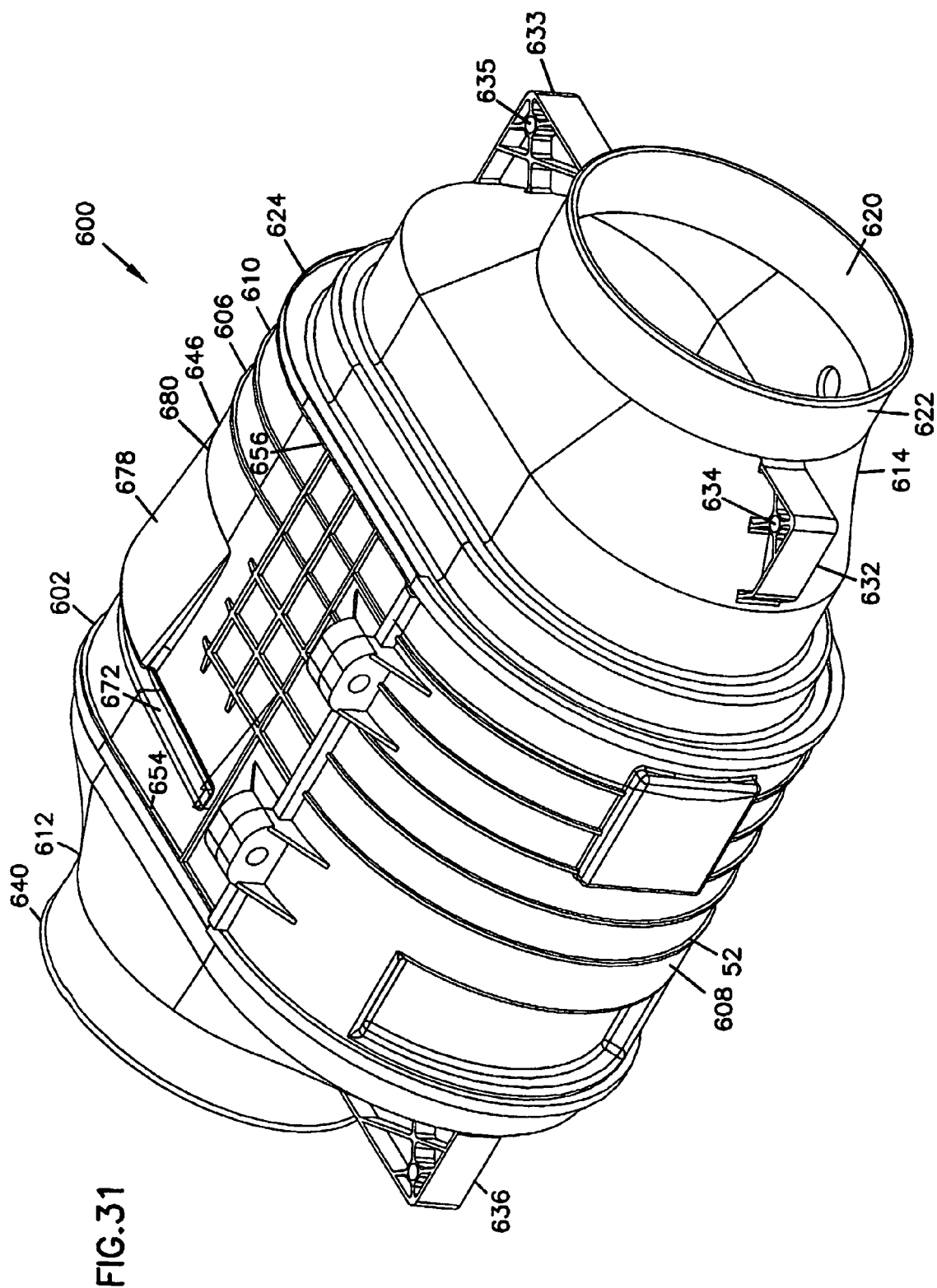
FIG. 31 is an alternate perspective view of the air cleaner depicted in FIG. 30.
Figure 32:
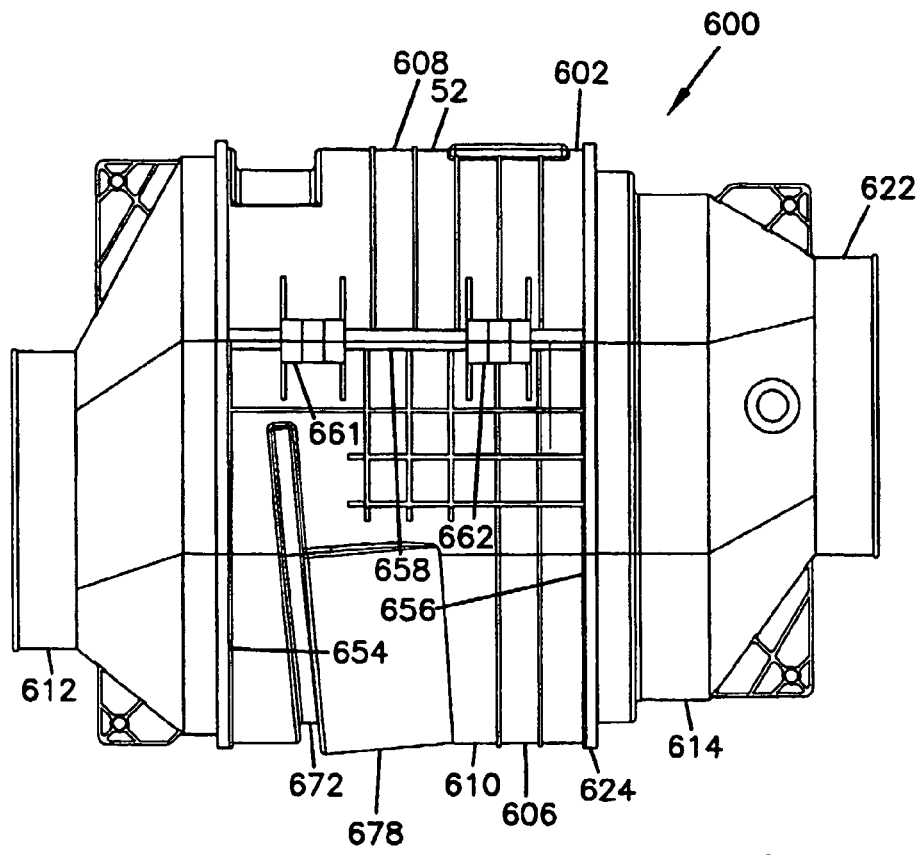
FIG. 32 is a top plan view of the air cleaner depicted in FIG. 30.
Figure 33:
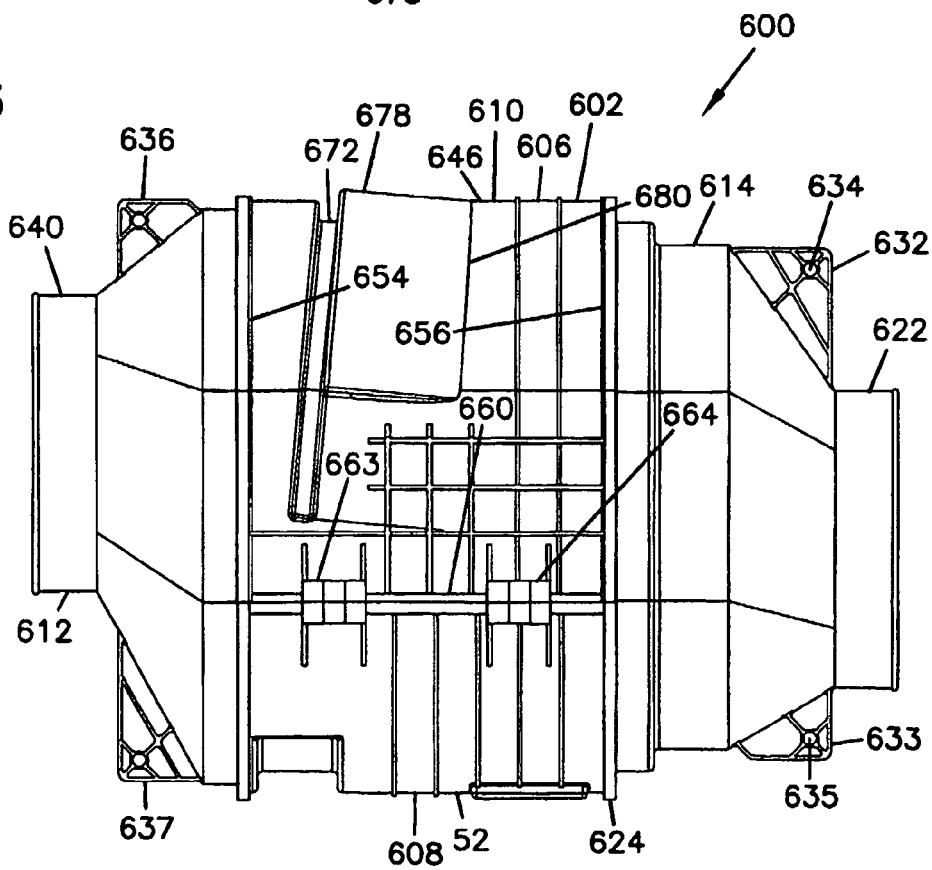
FIG. 33 is a bottom plan view of the air cleaner depicted in FIG. 30.
Figure 36:
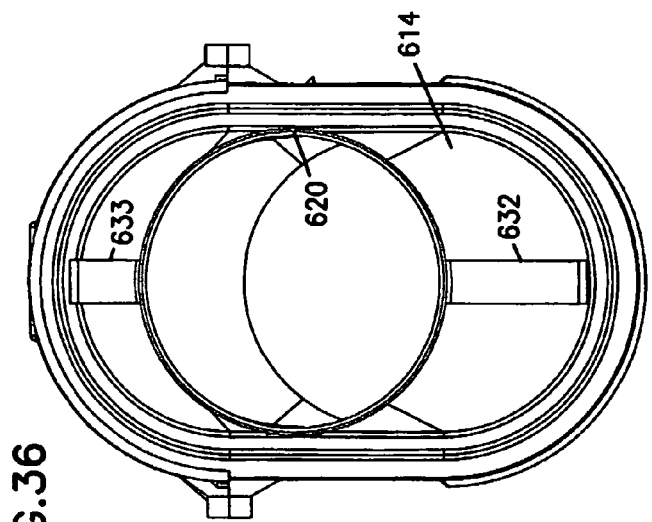
FIG. 36 is an end view opposite of that shown in FIG. 35.
Figure 34:
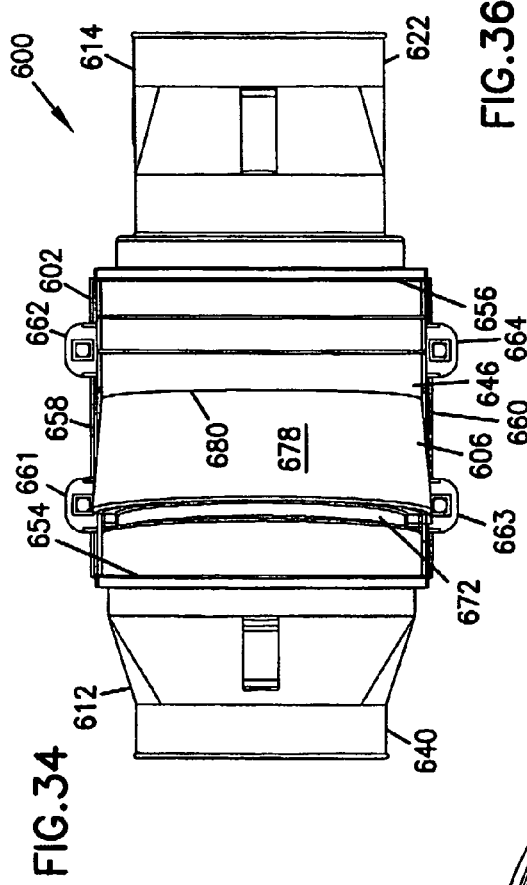
FIG. 34 is a right side elevational view of the air cleaner depicted in FIG. 30.
Figure 35:
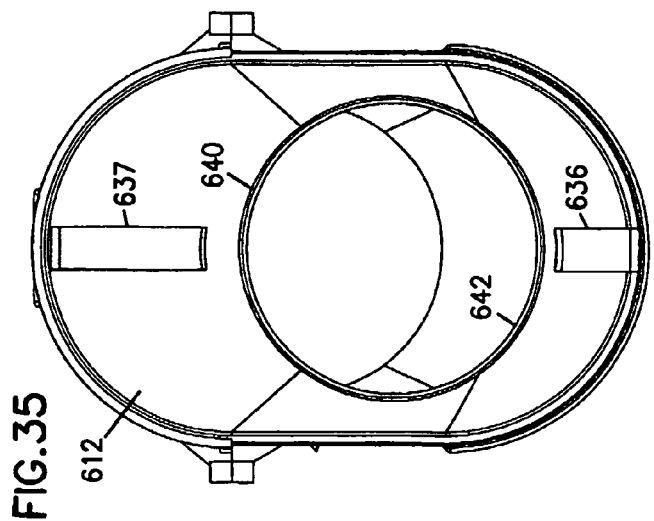
FIG. 35 is an end view of the air cleaner depicted in FIG. 30.

In reference now to FIG. 29, another embodiment of a filter element 50 useable in the air cleaner 40 is shown at 500. The filter element 500 illustrated has the same features as the filter element 50, described above, including z-media 502, band 504, and seal member 506. The features of the z-media 502, band 504, and seal member 506 are analogous to the z-media 80, band 168, and seal member 136 described above, and are not repeated here. There is also a frame construction 508, which is similar to, but not identical to the frame construction 134 described above. The frame construction 508, in the illustrated embodiment, is modified from frame construction 134 in order to accommodate a handle.

The filter element 500 differs from the filter element 50 in that it has a handle 510 secured thereto to aid in servicing of the air cleaner 40. Many different embodiments of handle 510 are useable. One particular handle is illustrated as reference numeral 512. Handle 512 shown is a non-rigid, flexible strap 514. Strap 514 is secured to a part of the element 500. A number of different ways to secure the strap 514 can be used. In the illustrated embodiment, the strap 514 is secured to the frame construction 508. In preferred implementations, the strap 514 is secured to the lip 516 (analogous to lip 146). In the way shown in FIG. 29, the lip 516 defines a through-slot 518 and projecting tab 520. The strap 514 extends through the slot 518 and is held therein by engagement between a portion 522 of the strap 514 and the tab 520. In particular, the strap portion 522 includes a T-section 524 that is wider than the largest dimension of the slot 518, and thus, cannot pass through the slot 518. The T-section 524 engages the tab 520 to be secured in position.

The example, illustrated strap 514 also defines a plurality of apertures 526. The apertures 526 help to allow for a good grip by the user on the strap 514. In some embodiments, the strap 514 can be doubled over to form a closed loop. The term "strap" herein means single or multiple bands, belts, strips, as well as ones are folded or doubled-over to form closed loops. Materials useable for strap 514 include plastic, such as flexible nylon, and other flexible polymeric materials; of course, other materials can be used. The strap 514 can be many different sizes. One usable size includes: a length of at least 5 cm, for example 8-30 cm, including 10-20 cm; and a width of at least 0.5 cm, for example 0.75-10 cm, including 1-5 cm.

The handle 510 allows for exertion of a pull force on the element 500 in a direction about 70-110 degrees, usually about 90 degrees, relative to the flow face 530. When the element 500 is installed in the housing 48, the handle 510 allows the pull force to be exerted on the element 500 to help release the seal 142 (FIG. 3) between the seal member 506 and sealing surface 176 (sealing surface 176 is described below). Once the seal 142 is released, the element 500 can be removed from the housing 48.

The element 500 is usable with the air cleaner 40, in the same way that the element 50 is, with the exception of removal of the element 50/500 from the air cleaner 40. The difference in the removal process relates to the use of the handle 510 that is present in element 500 and not in element 50. Otherwise, in all instances in this disclosure, when the element 50 is referenced, the element 500 is also useable and should be understood to be referenced by implication.

C. Example Housing 48

As mentioned above, preferred housings 48 will include body construction 62 and removable cover 52. Body construction 62 includes body member 60, inlet construction 56 and outlet construction 58.

It can be seen in FIG. 3 how the body construction 62 provides a sealing surface 176 against which the seal member 136 compresses to form radial seal 142. In the particular embodiment shown, the outlet construction 58 defines the sealing surface 176. In reference now to FIGS. 23-25, the outlet construction 58 is shown in detail. The particular embodiment of the outlet construction 58 shown includes an outlet construction housing 178. The housing 178 defines an interior volume 180 and an outlet port 182. The outlet port 182 is surrounded by a duct 184, which is typically connected to other ducting assembly. The housing 178 includes an outer rim 186 which connects to the body member 60. In preferred applications, the outlet construction housing 178 is secured in a permanent way to the body member 60, such as by hot plate welding. The rim 186 also provides for engagement with the service cover 52. The outlet construction housing 178 defines the sealing surface 176. The sealing surface 176 is an annular surface adjacent to the rim 186. Adjacent to the sealing surface 176 and angled thereto (preferably, orthogonally angled thereto), there is a stop surface 188. The stop surface 188 provides for an end surface for the seal member 136 to engage when the filter element 50 is properly seated within the housing 48.

Extending from an outer wall 190 of the sealing surface 176 is a mounting bracket 192. The mounting bracket 192 includes mounting apertures 193, 194 for accepting bolts or other mounting fasteners. The mounting bracket 192 is optionally usable to mount the air cleaner 40 onto equipment 32. As is described further, there is another mounting bracket on the inlet construction 56, which also may be used to mount the air cleaner 40. The provision of more than one mounting bracket on either the inlet construction 56 or outlet construction 58 provides for an ambidextrous air cleaner 40. That is, the air cleaner 40 can be mounted either at its inlet construction 56 or at its outlet construction 58.

Figure 11:
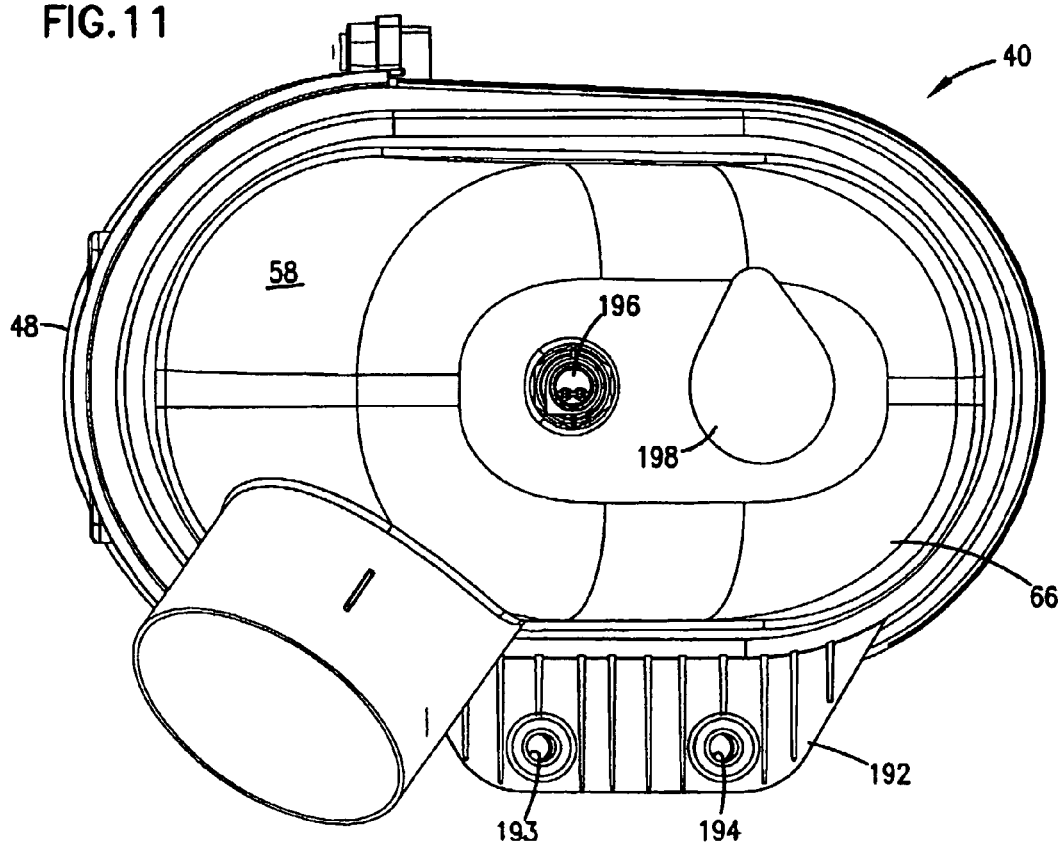
FIG. 11 is an end elevational view of the air cleaner depicted in FIG. 9 and showing an outlet end of the air cleaner.
Figure 15:
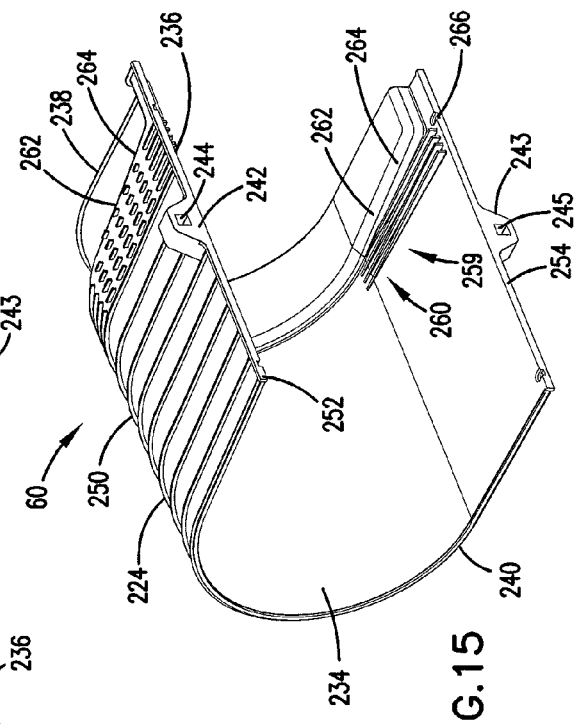
FIG. 15 is a perspective view of the housing body for the air cleaner depicted in FIGS. 2, 3, and 9-13.

In FIG. 11, an end view of the outlet construction 58 is viewable. The outlet construction 58, in preferred embodiments, includes provisions for a heat sensor 196; there is also a mount 198 available for a restriction indicator.

Attention is next directed to FIGS. 3, 10, and 19-21. One embodiment of an inlet construction 56 is illustrated. The inlet construction 56 shown includes an inlet construction housing 202 including an inlet duct 204 defining an inlet port 206. The inlet construction housing 202 further defines an internal volume 208. Circumscribing the internal volume 208 is an outer rim 210 which interacts with and engages with the body member 60 and the cover 52. In preferred embodiments, the inlet construction housing 202 is secured in a permanent manner to the body member 60 by welding along the rim 210 to the body member 60.

Extending from the rim 210 is a mounting bracket 212. The mounting bracket 212, in the embodiment shown, is constructed identically to the bracket 192 on the outlet construction housing 178. The bracket 212 includes a flange 214 and first and second mounting apertures 215, 216. The apertures 215, 216 are for receiving suitable fasteners, such as bolts, for securing the bracket 212 and the housing 48 to the desired equipment 32. A mounting plate 219 extends from the rim 210 and is angled relative to the flange 214. Supporting the flange 214 is gusset structure 218 between the plate 219 and the flange 214.

Figure 22:
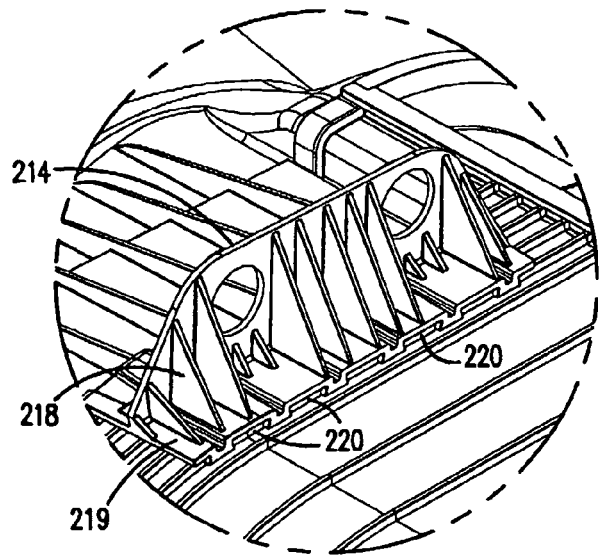
FIG. 22 is an enlarged, perspective view showing a portion of the inlet construction interlocking with a portion of the air cleaner body.
Figure 18:
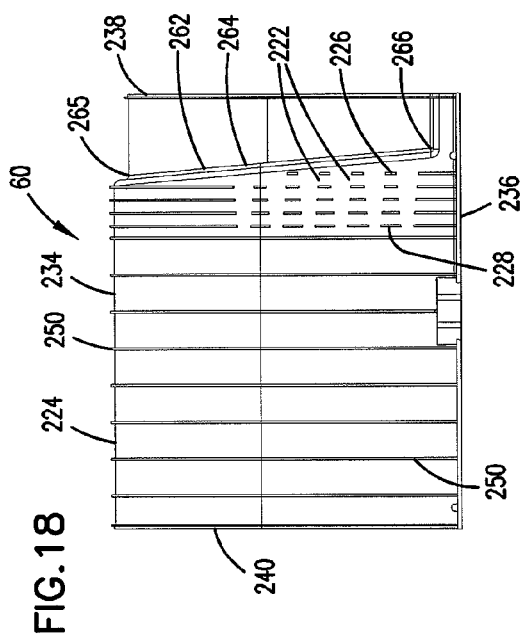
FIG. 18 is a top plan view of the housing body depicted in FIG. 15.
Figure 16:
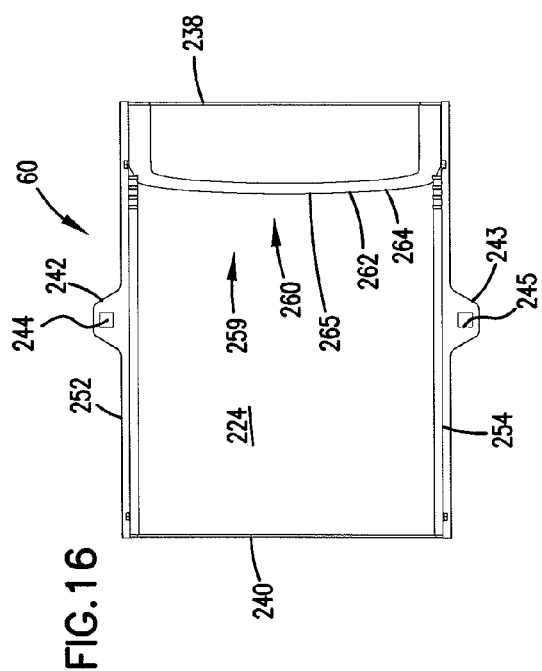
FIG. 16 is a side elevational view of the interior portion of the housing body depicted in FIG. 15.
Figure 19:
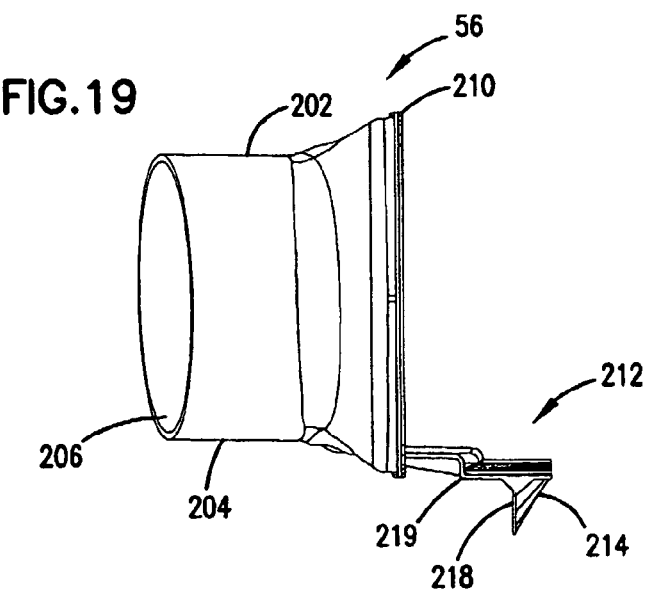
FIG. 19 is a side elevational view of the inlet construction used for the air cleaner housing depicted in FIGS. 2, 3, and 9-13.
Figure 21:
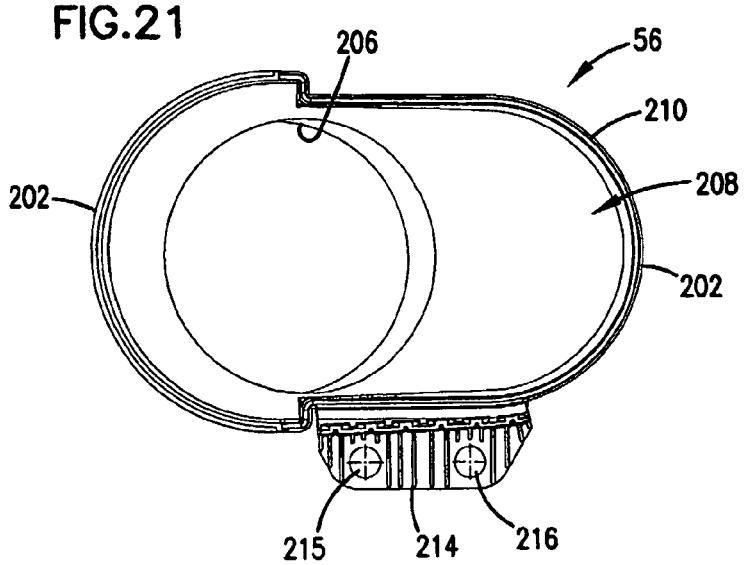
FIG. 21 is a right end elevational view of the inlet construction depicted in FIG. 19.
Figure 20:
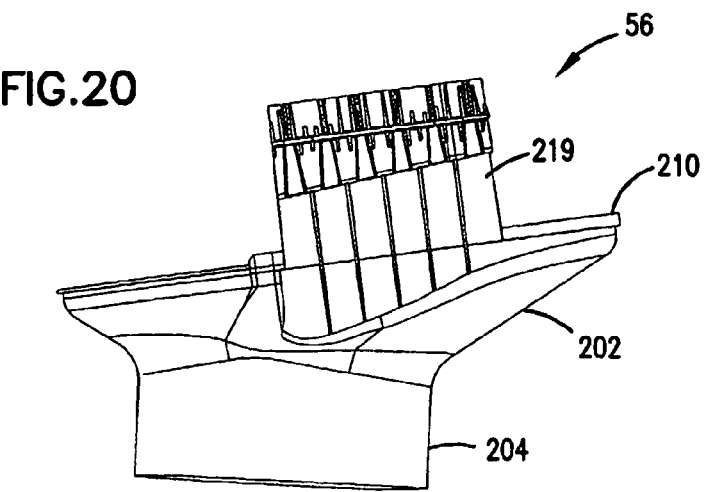
FIG. 20 is a bottom plan view of the housing inlet construction depicted in FIG. 19.

Each of the mounting brackets 212 and 192 are constructed and arranged to slide and lock in place with the body member 60, which allows for adaptability in mounting locations and style. Attention is directed to FIG. 22. FIG. 22 is an enlarged view showing interaction between the inlet construction housing 202 and the body member 60. The bracket 212 defines a plurality of grooves 220. The grooves 220 receive tapered ribs 222 (FIG. 18) extending from a side wall 224 of the body member 60. As can be seen in FIG. 18, the ribs 222 taper or angle from a narrow section 226 to a wide section 228. The narrow section 226 is oriented closer to the inlet construction 56 than the wide section 228. The tapering of the ribs 222 allows for easier sliding in of the ribs 222 into the grooves 220, because the narrow section 226 is received first into the groove 220.

Figure 17:
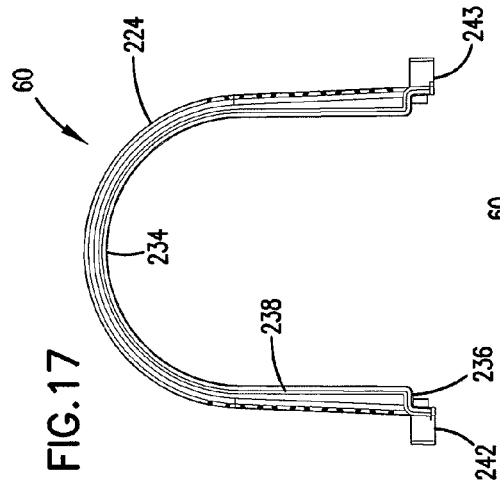
FIG. 17 is an end elevational view of the housing body depicted in FIGS. 15 and 16.

Attention is next directed to FIGS. 8 and 15-18. One embodiment of the body member 60 is illustrated. As mentioned above, the body member 60 includes side wall 224. In FIG. 17, it can be seen how the side wall 224 is curved in a shape that generally corresponds to the shape of the filter element 50. In this case, the side wall 224 is U-shaped. As such, the side wall 224 includes a bight section forming a closed end 234 and a mouth or open end 236. The open end 236 is sufficiently large enough to accommodate accepting the filter element 50 therethrough. The open end 236, in this embodiment, also corresponds to the side entry 72. The side wall 224 also defines an inlet end 238, which is mounted adjacent to the inlet construction 56 and an outlet end 240, which is mounted adjacent to the outlet construction 58. Edges 252, 254 extend between the inlet end 238 and the outlet end 240. A pair of mounting flanges 242, 243 extend from the side wall 224. The mounting flanges 242, 243 each include an aperture 244, 245 for receiving fasteners 246, 247 (FIG. 3) for removably securing the cover 52 to the body member 60.

The side wall 224 also includes a plurality of ribs 250 extending from edge 252 to edge 254, preferably continuously along the wall 224. The ribs 250 provide strength to the body member 60. Edge 252 and edge 254 define the mouth or open end 236. The edges 252, 254 also interact with and engage the cover 52.

The air cleaner 40 includes a system 259 for operably mounting the filter element 50 within the body construction 62. Generally, the air cleaner system 259 is constructed and arranged to cam the filter element 50 into sealing engagement with the housing. In one example, the system 259 includes a slide mount 260. The slide mount 260 enables the filter element 50 to be conveniently and smoothly inserted through the mouth or opening 236 and oriented with the seal member 136 compressed against the sealing surface 176 to form radial seal 142. A number of different implements are possible. In the particular implement illustrated in the drawings, the slide mount 260 includes a ramp 262. In the preferred embodiment, the ramp 262 defines an angled slide surface 264, which angles downwardly from the open end 236 to the closed end 234. By the term "angled downwardly", it is meant that the slide surface 264 is closer to the inlet end 238 at the open end 236 adjacent to the edges 252, 254 than the slide surface 264 is to the inlet end 238 at the bight section or closed end 234 of the side wall 224. This can be seen, for example, in FIG. 18. FIG. 18 is the exterior view of the ramp 262, but the shape of the ramp 262 can be seen as having the angled slide surface 264 angling from the closed end 234 to the open end 236. Another way of putting it is the ramp 262 is deepest at the closed end 234 forming deep ramp section 265, and narrowest at the open end 236 forming shallow ramp section 266. Between the open end 236 and the closed end 234, the ramp 262 forms a straight, and continuous slide surface 264.

The ramp 262 provides a camming surface for engaging the filter element 50 in order to urge or push the filter element 50 in place with the radial seal 142 formed with the housing 48. In particular, the ramp 262 translates the direction of the force applied to the filter element 50 from a force in a direction shown by arrow 268 (FIG. 8) (a lateral direction) directed toward the closed end 234 to a direction shown by arrow 270 (an axial direction) in a direction toward the outlet construction 58. In the preferred embodiment shown, the ramp 262 has a slope of less than 30 degrees, typically 5-25 degrees, and preferably 10-20 degrees.

In preferred embodiments, the band 168 on the filter element 50 is provided to engage and slide against the slide surface 264 in order to mount the filter element 50 into operable assembly in the housing 48.

Attention is next directed to FIGS. 3, 9, 12-14 and 26. The cover 52 is illustrated in various views. As mentioned above, the cover 52 is selectively removable from the body member 60 to selectively expose and cover the access opening 70. In this embodiment, the access opening 70 also corresponds to the mouth or the open end 236 of the body member 60.

Figure 9:
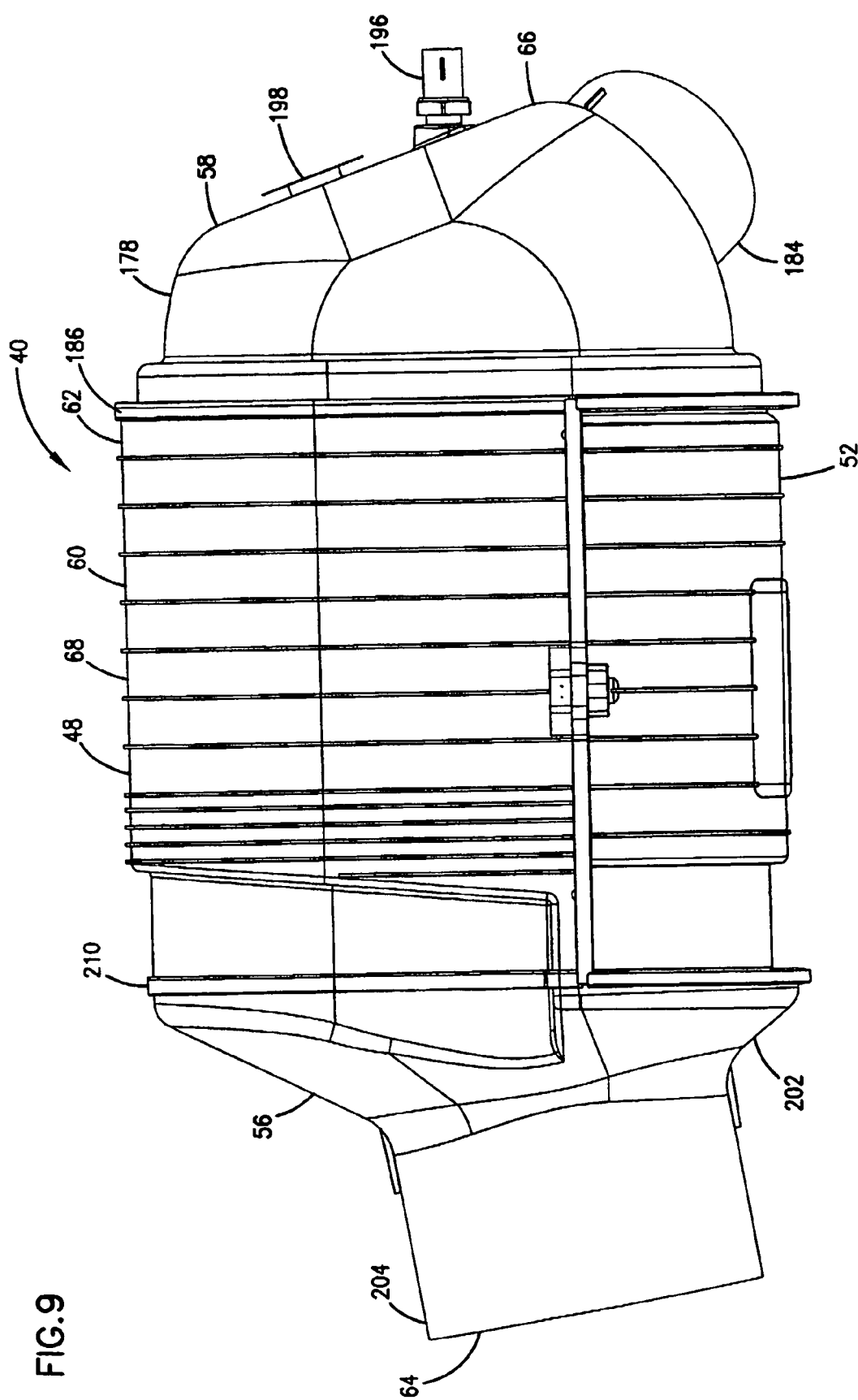
FIG. 9 is a side elevational view of the air cleaner depicted in FIGS. 2 and 3.
Figure 10:
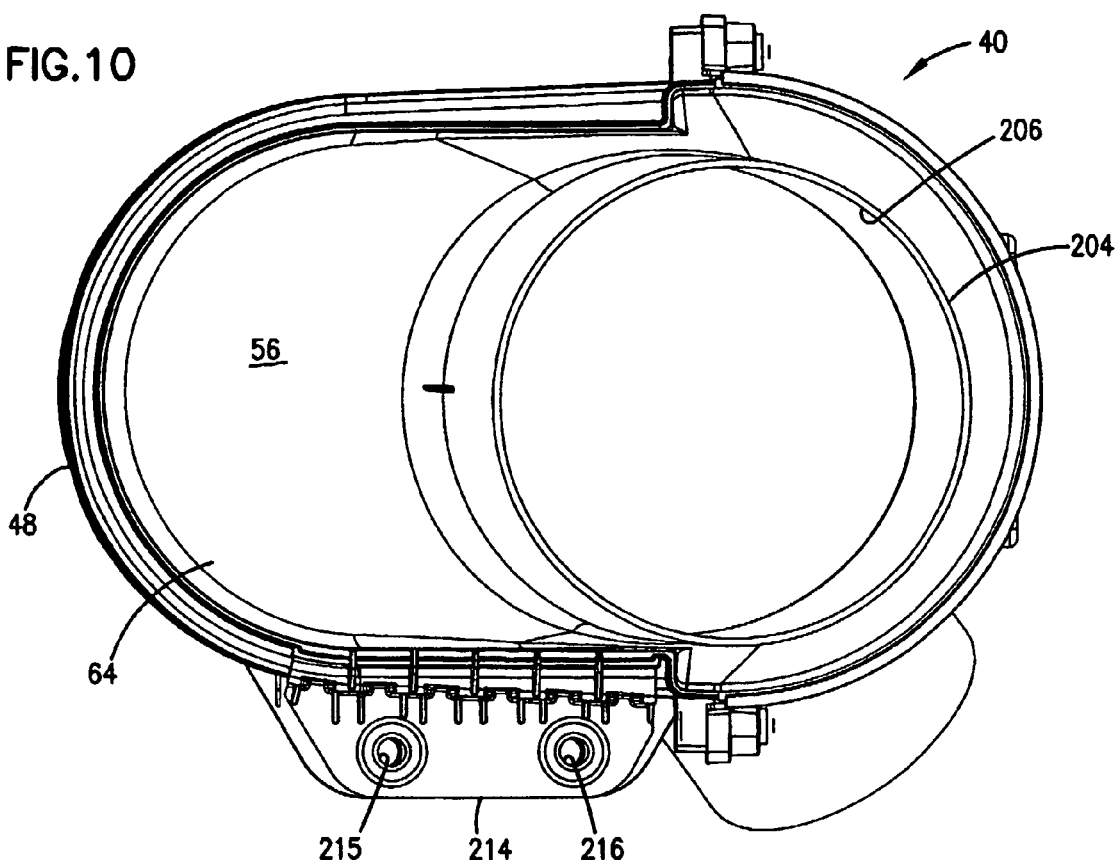
FIG. 10 is an end elevational view showing an inlet end of the air cleaner depicted in FIG. 9.

Although functionally the same, the cover 52 in FIGS. 9 and 26 differ somewhat from the cover shown in FIGS. 3 and 12-14 in that the cover 52 in FIGS. 9 and 26 have a portion for accommodating product labeling.

The cover 52 includes a curved side wall 276. In the embodiment shown in FIG. 13, the side wall 276 is generally C-shaped. The cover includes an inlet end 278, which is adjacent to the inlet construction 56; and opposite outlet end 280, which is adjacent to the outlet construction 58; and a pair of edges 282, 283 extending between the inlet end 278 and outlet end 280. The side wall 276 is preferably continuous and uninterrupted between the inlet end 278, outlet end 280, edge 282, and edge 283. Extending from each of the edges 282, 283 are mounting flanges 286, 288. The flanges 286, 288 are oriented to overlap with the flanges 242, 243 in the body member 60. The flanges 286, 288 accommodate fasteners 246, 247 for removably securing the cover 52 to the body member 60.

The side wall 276 includes a plurality of strengthening ribs 290, which extend from edge 282 continuously to edge 283. The ribs 290 are preferably evenly spaced apart from each other.

The cover 52 also includes a system for supporting and stabilizing the filter element 50. In one preferred embodiment, the side wall 276 of the cover 52 defines a shoulder or ledge 292. The ledge 292 comprises an annular surface 294 that extends from an element covering portion 296 of the side wall 276 to a neck 298. The neck 298 is adjacent to the inlet end 278 of the side wall 276, while the element covering portion 296 is adjacent to the outlet end 280. The ledge 292 engages the filter element 50, in particular, the band 168 of the filter element 50. As such, the ledge 292 engages the band 168. FIG. 26 shows the band 168 engaged against the ledge 292.

It should be appreciated that the opposite end 302 (FIG. 8) of the element 50 is supported by engagement between the band 168 and the deep ramp section 265 at the closed end 234 of the body member 60.

The cover 52 also helps to support and keep the filter element 50 oriented in operable assembly seated with the seal 142 in place while in the housing 48. In particular, the cover 52 includes a projection 304 that extends or projects toward the interior volume 54 of the housing 48, when the cover 52 is operably mounted on the body member 60. In the orientation shown in FIG. 14, the projection 304 is hook-shaped or J-shaped. As can be seen in FIG. 26, the projection 304 extends into and out of the recess 150 in the filter element 50. By the term "into and out of", it is meant that the projection 304 has a portion 306 that extends into the recess 150 as well as a portion 308 that leads from the portion 306 to the outside of the recess 150. As can be seen in FIG. 26, the portion 308 of the projection 304 is adjacent to and below the end surface 154 of the seal member 136.

In use, after the filter element 50 (or 500) is operably assembled into the body construction 62, the cover 52 is oriented over the exposed portion of the filter element 50 and mounted to the body member 60. If the filter element 50 is not properly seated within the housing 48 with the radial seal 142 formed, the cover 52 will be precluded or prevented from fitting or properly mounting to the body member 60. If the filter element 50 is properly mounted within the body construction 62, the cover 52 is guided to the proper mount by way of engagement between the band 168 and the ledge 292. Further, the projection 304 will be received by the recess 150 in the filter element 50. Also, the mounting flanges 286, 288 will match with the flanges 242, 243 so that the fasteners 246, 247 can be mounted therein.

Figure 27:
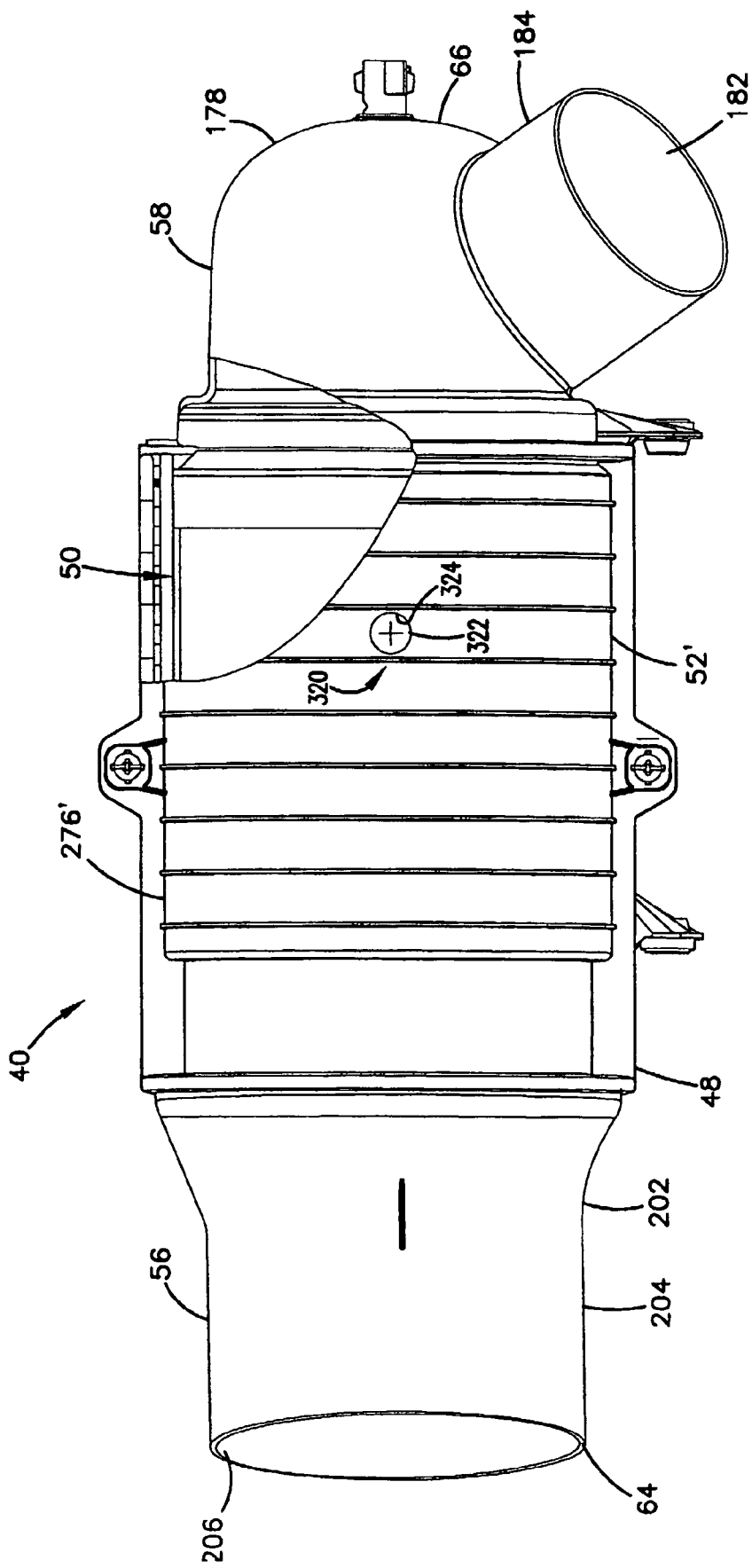
FIG. 27 is a side elevational view of an alternate embodiment of the air cleaner, the view being analogous to the view depicted in FIG. 3.
Figure 28:
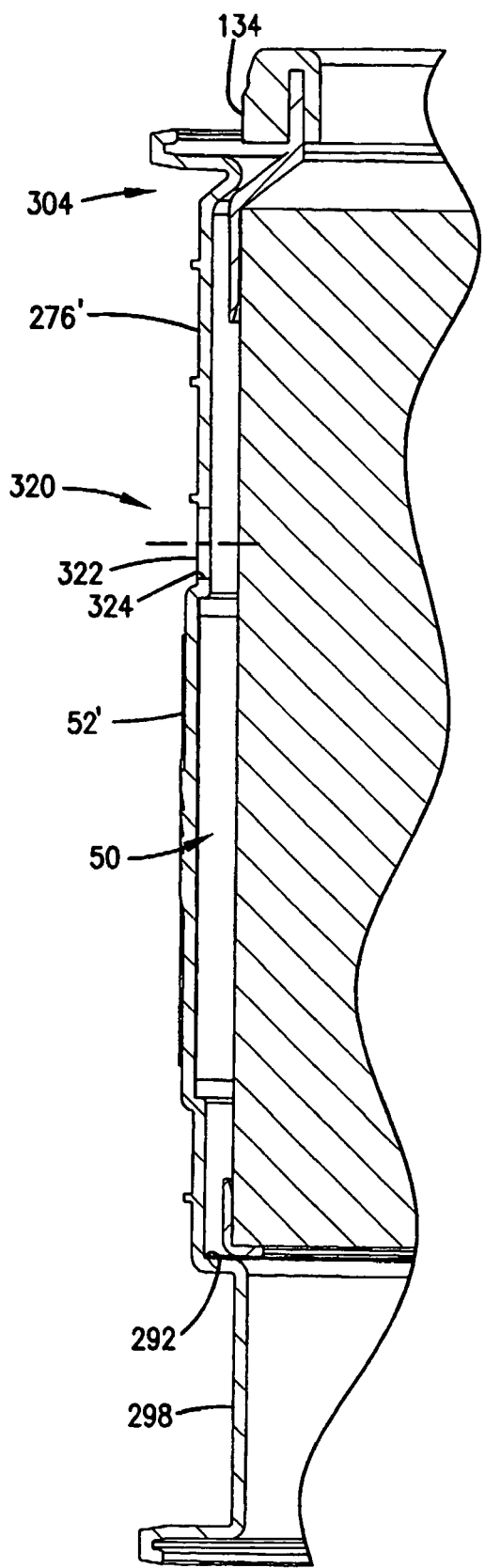
FIG. 28 is a view analogous to the view depicted in FIG. 26, but showing the alternate embodiment of FIG. 27.

FIGS. 27 and 28 show an alternate embodiment of the cover 52, depicted as 52'. A method for visually identifying the presence of the filter element 50 within the housing 48 without removal of the cover is provided by including a window 320 in the housing 48. The window 320 is oriented such that the filter element 50 is viewable through the window 320, when the filter element is installed within the housing 48. While the window 320 can be placed in many locations, in the particular illustrated embodiment, the window 320 is located in the cover 52'. In the illustrated embodiment, the window 320 includes a clear lens 322 snap-fit into an aperture 324 in the sidewall 276' of the cover 52'. The lens 322 can be made from durable, clear materials, such as polycarbonates. In preferred applications, the exterior of the filter element 50 is a bright color so that the element 50 is highly visible through the window 320. For Donaldson Company, the assignee of this disclosure, the color is also preferably source-indicative, so that the user knows the element 50 used is a Donaldson filter element. Donaldson blue would be preferred for Donaldson. The window 320 shown has a round shape (a circle), but in other embodiments, the window 320 can be other shapes such as irregular, polygon, rectangular, starburst, swirl, etc.

D. Methods of Use, Installing, and Servicing

To install the filter element 50 into the housing 48, the cover 52 is removed from the body construction 62 to expose the access opening 70. The filter element 50 is oriented such that the second end 82 of the element 50 is adjacent to the outlet construction 58, while the first end 81 is oriented adjacent to the inlet construction 56. The band 168 is oriented such that it engages the ramp 262. The filter element 50 is slid through the side entry 72 along the slide mount 260 in the direction of arrow 268. Engagement of the slide surface 264 against the band 168 moves the filter element in a direction toward the outlet construction 58 to urge the seal member 136 against the sealing surface 176 of the outlet construction 58. Eventually, the filter element 50 reaches the closed end 234 and the deep ramp section 265. At this point, the seal member 136 should be in place forming the radial seal 142 between and against the sealing surface 176 of the housing 48 and the rigid projection 138 on the frame construction 134 of the filter element 50. The cover 52 is then oriented over the exposed portion of the filter element 50. The ledge 292 engages the band 168 to support the filter element 50, while the projection 304 extends into and is received by the recess 150 in the filter element 50. The fasteners 246, 247 are inserted to connect the cover 52 to the body member 60. The air cleaner 40 is then ready for filtering operation.

To use the air cleaner 40, dirty air passes through the intake region 35 (FIG. 1), into ducting, and eventually through the inlet duct 204 of the inlet construction 56. The air then flows to the filter element 50 and passes through the first flow face 84. The dirty air is then forced to flow through the filter media 80, where the air is at least partially cleaned of particulate material. The clean air exits the filter element 50 by flowing from the second flow face 86. From there, the clean air flows through the outlet construction 58 and through the outlet duct 184. The clean air is then used by equipment 32, such as in an internal combustion engine 33.

After a period of operation, the filter element 50 will become clogged or occluded with an unacceptably high level of restriction. Servicing of the air cleaner 40 will become necessary. By "servicing", it is meant removal of the filter element 50 and replacement with a new filter element 50.

To service the air cleaner 40, the cover 52 is removed from the housing 48 by removing the fasteners 246, 247. The cover 52 is removed to expose the access opening 70 defined by the mouth or open end 236 of the body member 60. The old filter element 50/500 is then removed from the housing 48 through the access opening 70. This is done by, first, releasing or breaking the seal 142 between the filter element 50/500 and the housing 48. For the element 50, the seal 142 is released by holding the exposed edge of the filter element 50 and applying a force in the direction of the inlet construction 56. For the element 500, the strap 514 is grasped by a user's hand, and a pull force is exerted about 90 degrees relative to the flow face 530 (e.g., in a direction toward the inlet construction 56). For element 50 or 500, when a force is applied in this direction, the band 168 engages against the deep section 265 of the ramp 262. This allows the filter element 50/500 to tilt about the pivot region created by the engagement between the band 168 and the deep section 265 of the ramp 262. This tilting action pulls the filter element 50/500 from the sealing surface 176 to release the radial seal 142. The filter element 50/500 can then be removed through the side entry 72 outside of the air cleaner 40.

The old filter element 50/500 is then disposed of. A second, new filter element 50/500 is provided. The new filter element 50/500 is installed in the air cleaner 40 by mounting it through the side entry 72 and sliding the element 50/500 in operable assembly within the housing 48. The cover 52 is then placed over the exposed portion of the filter element 50/500 and secured to the body member 60.

E. General Principles and Examples

In general, there is provide a method of servicing an air cleaner, the air cleaner including a filter element installed in a housing; the method comprising: tilting the filter element against a tilt surface in the housing to release a seal between the filter element and the housing; the filter element having first and second opposite flow faces; the filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion.

The step of tilting the filter element against a tilt surface in the housing to release a seal includes releasing a radial seal between the filter element and housing.

After the step of tilting, there is a step of removing the filter element through an opening in a side of the housing.

After the step of removing, providing a second filter element and installing the second filter element in the housing; the second filter element having first and second opposite flow faces; the second filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion.

The housing includes a ramp; the ramp forming a portion of the tilt surface; and the step of installing includes sliding a portion of the second filter element against the ramp in the housing to form a seal between a seal member on the second filter element and a sealing surface in the housing.

Before the step of tilting, there is a step of removing a cover from a side in the housing to expose an opening in the side of the housing.

After the step of installing, there is a step placing a cover over the opening in the housing.

After the step of placing a cover, viewing the filter element in the housing through a window in one of the cover and the housing.

The step of tilting the filter element against a tilt surface includes exerting a pull force to the element in a direction about 70-110 degrees relative to the second flow face. In one example, the element is pulled in a direction about 90 degrees relative to the second flow face.

The step of exerting a pull force includes pulling a handle secured to the filter element.

The step of pulling a handle includes pulling a flexible strap secured to the filter element.

The filter element includes a frame construction mounted thereon; and the step of pulling a flexible strap includes pulling a flexible strap secured to the frame construction.

A filter element is provided. One useable filter element includes a media pack having first and second opposite flow faces; the media pack including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion; a seal member secured to the media pack; and a flexible strap secured to a portion of the filter element.

A frame construction is mounted on the media pack; the frame construction supporting the seal member; the flexible strap being secured to the frame construction.

The frame construction has a lip mounted on an end thereof and an extension projecting axially from the second flow face; the seal member being supported by the extension of the frame construction; the flexible strap is secured to the lip of the frame construction.

The lip defines a through-slot; and the flexible strap extends through the through-slot.

An air cleaner is provided comprising: a housing having first and second opposite ends and a sidewall between the first and second ends; in some embodiments, the first end comprises an air inlet end and the second end comprising an air outlet end; the sidewall defining an access opening; an access cover removably positioned over the access opening; and a filter element operably installed in the housing; the filter element having first and second opposite flow faces; the filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion; the housing being constructed and arranged to accept the filter element through the access opening in the sidewall and to cam the filter element into sealing engagement with the housing.

In one embodiment, the housing sidewall includes a slide mount to cam the filter element into sealing engagement with the housing. In some embodiments, the slide mount is in the form a ramp in the sidewall.

The access cover includes a projection extending within a recess defined by the filter element.

The filter element includes a seal member and a frame construction; the frame construction having an extension projecting axially from the second flow face; the seal member being supported by the extension of the frame construction;

the seal member being compressed between and against the extension of the frame construction and the housing to form a radial seal.

The recess in the filter element is adjacent to the seal member.

The filter element includes a band around a periphery of the first flow face; and the access cover includes a ledge engaging the band to support the filter element.

The access cover includes a ledge extending toward an internal volume in the housing; and the filter element is supported at the first flow face by the ramp and by the ledge on the access cover.

The filter element includes a band around a periphery of the first flow face; the band engaging the ramp and the ledge.

The access cover includes a window to provide visual access to an internal volume of the housing.

An air cleaner is provided comprising a housing having first and second opposite ends and a sidewall between the first and second ends; and a filter element operably installed in the housing; the filter element having first and second opposite flow faces; the filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion; the filter element including a sealing gasket adjacent to the second flow face; the filter element defining a peripheral recess adjacent to the sealing gasket; the housing including a projection extending into and out of the peripheral recess.

The filter element includes a frame construction; the frame construction having a lip mounted on an end thereof and an extension projecting axially from the second flow face; the sealing gasket being supported by the extension of the frame construction; the sealing gasket being compressed between and against the extension of the frame construction and the housing to form a radial seal; the peripheral recess being defined by the frame construction and being between the lip and the extension.

The filter element includes a band around a periphery of the first flow face; and the housing includes a ledge engaging the band to support the filter element.

A method of installing a filter element into an air cleaner housing is provided; the method including: orienting a filter element in a housing body; the filter element having first and second opposite flow faces; the filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion; the filter element defining a recess in an outer, annular portion of the filter element; forming a seal between the filter element and the housing body; and orienting a cover member over the housing body; the cover member including a projection; the step of orienting a cover member including placing the projection to extend into and out of the recess in the filter element.

A housing construction is provided comprising: a housing wall; the housing wall including a duct defining a fluid port; the housing wall having a rim; a mounting bracket extending from the rim of the wall; the bracket including: a flange defining a fastener-receiving aperture arrangement; a mounting plate extending between the flange and the rim; the flange being angled relative to the flange; the mounting plate defining a plurality of rib-receiving grooves; and a gusset arrangement between the mounting plate and the flange to support the flange.

The wall further defines an annular sealing surface adjacent to the rim, and an end stop surface angled adjacent thereto.

An engine having a rated air flow of at least 50 cfm an air intake; and an air cleaner construction mounted in airflow communication with the air intakes provided; the air cleaner construction including a housing having first and second opposite ends and a sidewall between the first and second ends; the sidewall defining an access opening and a ramp extending from the opening toward a closed portion of the housing; an access cover removably positioned over the access opening; and a filter element operably installed in the housing; the filter element having first and second opposite flow faces; the filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion.

A method for detecting the presence of a filter element within an air cleaner is provided; the method comprising: visually inspecting an air cleaner housing with a cover mounted thereon; and viewing through a window in either the cover or the housing to determine whether a filter element is visible through the window in the housing.

F. The Embodiment of FIGS. 30-43

In FIGS. 30-43, another embodiment of an air cleaner is depicted at 600. The air cleaner 600 includes a housing 602 operably holding a removable and replaceable filter element 604 (FIGS. 37-43). The filter element 604 can be a variety of filter elements. Useable filter elements include examples described above, such as filter element 50 and filter element 500. The descriptions of these example embodiment filter elements are incorporated herein by reference, and should be understood are useable with the air cleaner 600 described in connection with FIGS. 30-43. The element 604 will utilize the same reference numerals as filter element 50, described above.

The housing 602 in the embodiment of FIGS. 30-43, includes a body construction 606 and a removable cover 608. The removable cover 608 is preferably identical, or very similar to, the cover 52, described above. The removable cover 608 will utilize the same reference numerals as cover 52, since these parts are identical or very similar.

The body construction 606 includes body member 610, inlet construction 612, and outlet construction 614. In FIGS. 37-43, it can be seen how the body construction 606 provides a sealing surface 616 against which the seal member 136 compresses to form a radial seal 618. In the particular embodiment shown, the outlet construction 614 defines the sealing surface 616.

The outlet construction 614 includes an outlet port 620 (FIGS. 31 and 36) surrounded by a duct 622. The outlet construction 614 includes an outer rim 624 which connects to the body member 610. In preferred applications, the outlet construction 614 is secured in a permanent way to the body member 610. The rim 624 also provides for engagement with the service cover 52. The sealing surface 616 is adjacent to the rim 624. Adjacent to the sealing surface 616 and angled thereto (preferably, orthogonally angled thereto) there is a stop surface 626. The stop surface 626 provides for an end surface for the seal member 136 to engage when the filter element 50 is properly seated within the housing 602.

Figure 38:
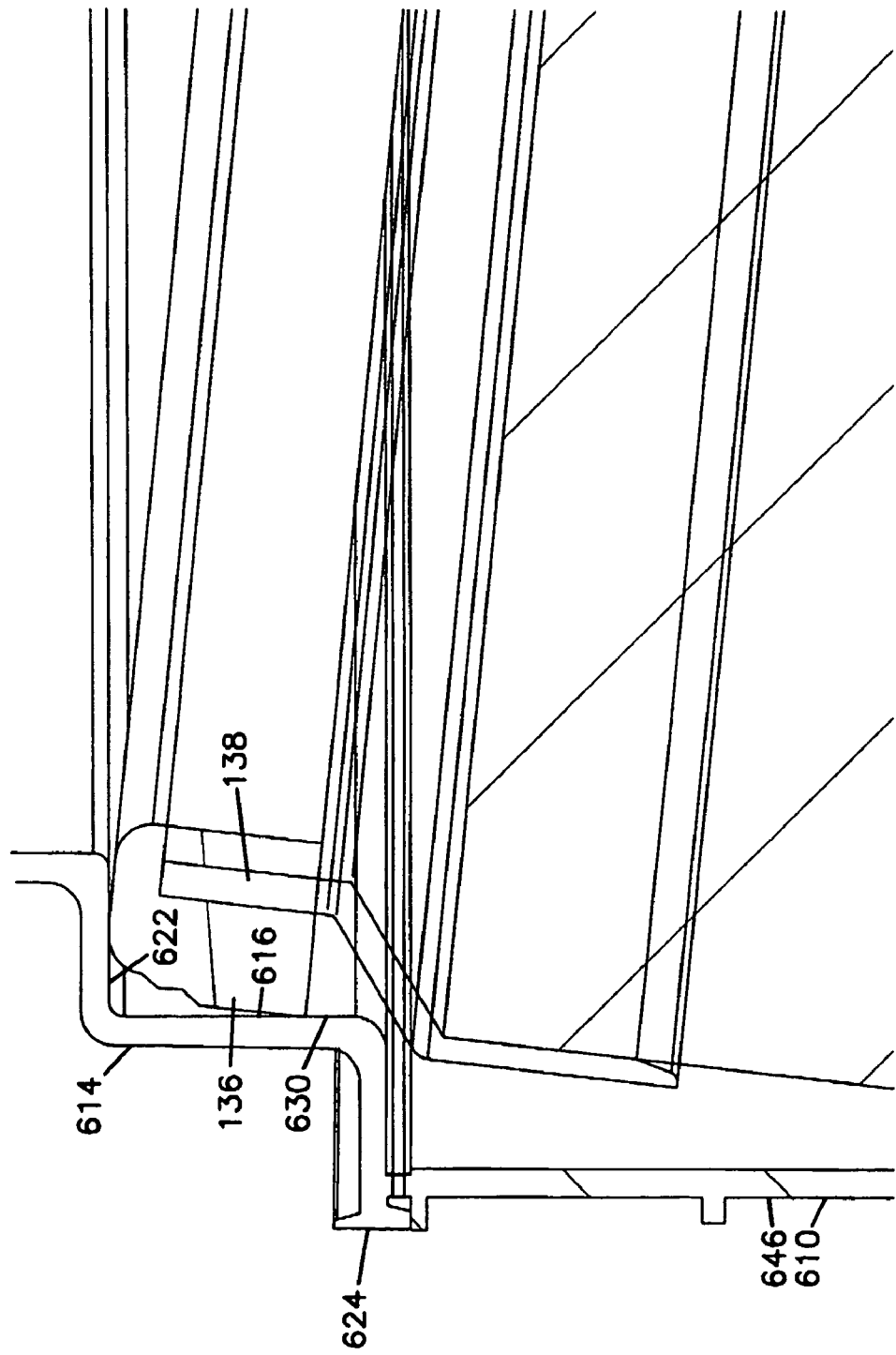
FIG. 38 is an enlarged view of a portion of FIG. 38.

The outlet construction 614 also includes a cam, tilt, or pivot region 630 (FIGS. 37 and 38). The pivot region 630 allows for proper installation and removal of the filter element 50 from the housing 602. This is described further below.

Extending from the outlet construction 614 are mounts 632, 633. Mounts 632, 633 include apertures 634, 635 for accepting bolts or other mounting fasteners. The mounts 632, 633 are useable to mount the air cleaner 600 onto equipment 32. There are further mounts 636, 637 on the inlet construction 612.

The inlet construction 612 illustrated includes an inlet duct 640 defining an inlet port 642. The inlet construction 612 has an outer rim 644 (FIG. 37) that interacts with and engages the body member 610 and the service cover 52. In preferred embodiments, the inlet construction 612 is secured in a permanent manner to the body member 610.

Figure 39:
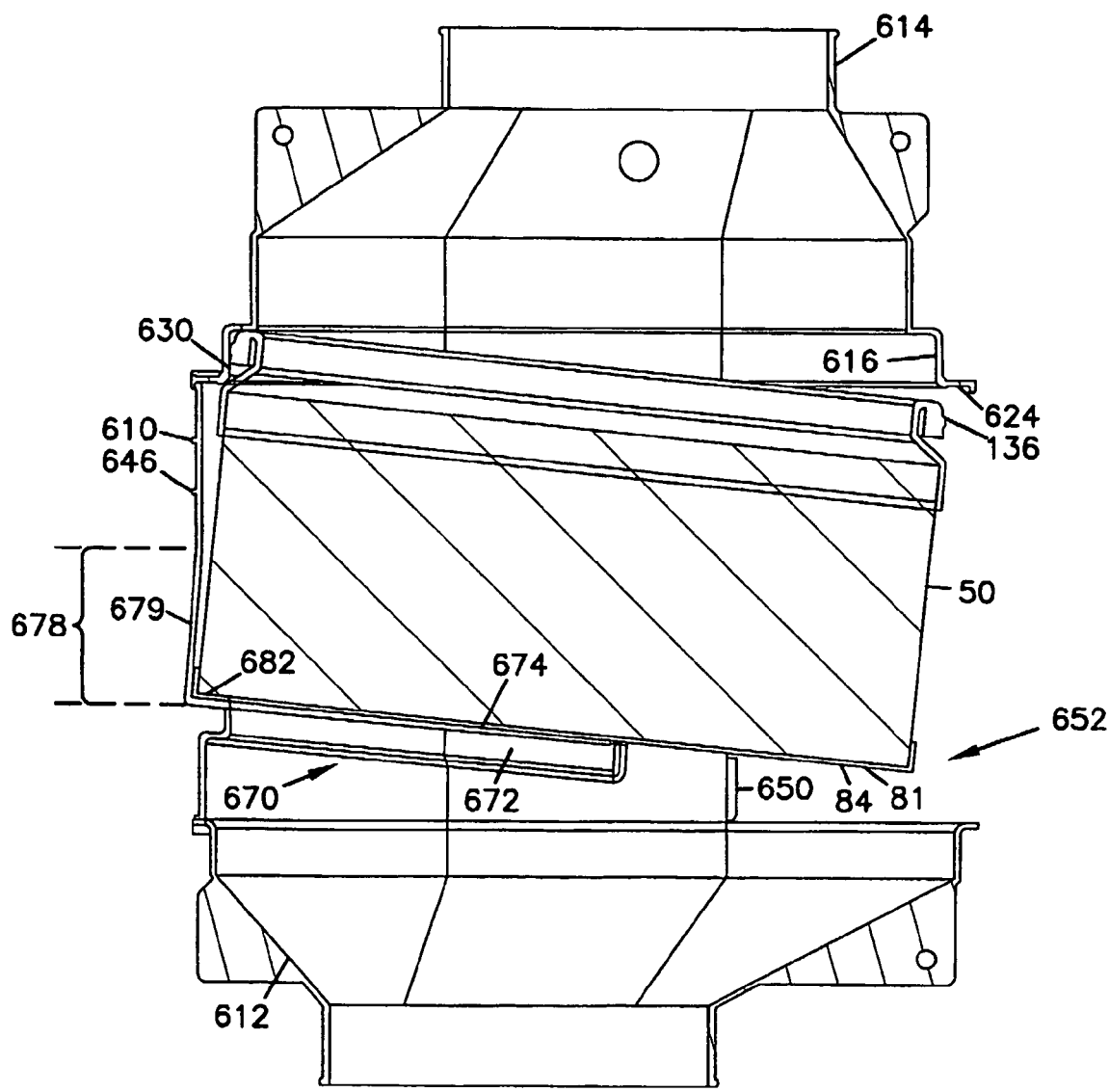
FIG. 39 is a schematic, cross-sectional view showing one step of removing a filter element from the air cleaner of FIGS. 30-36.
Figure 40:
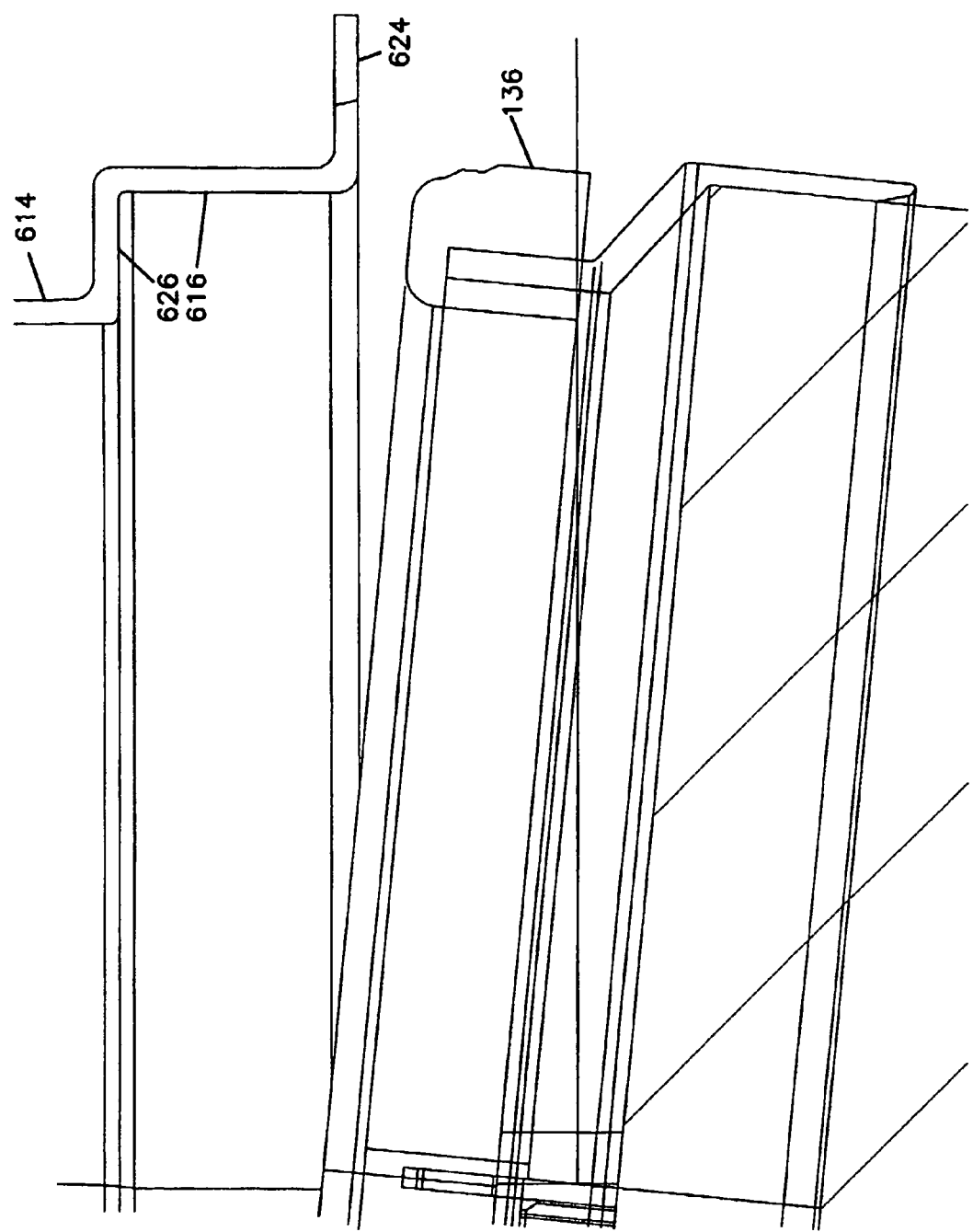
FIG. 40 is an enlarged view of a portion of FIG. 39.
Figure 41:
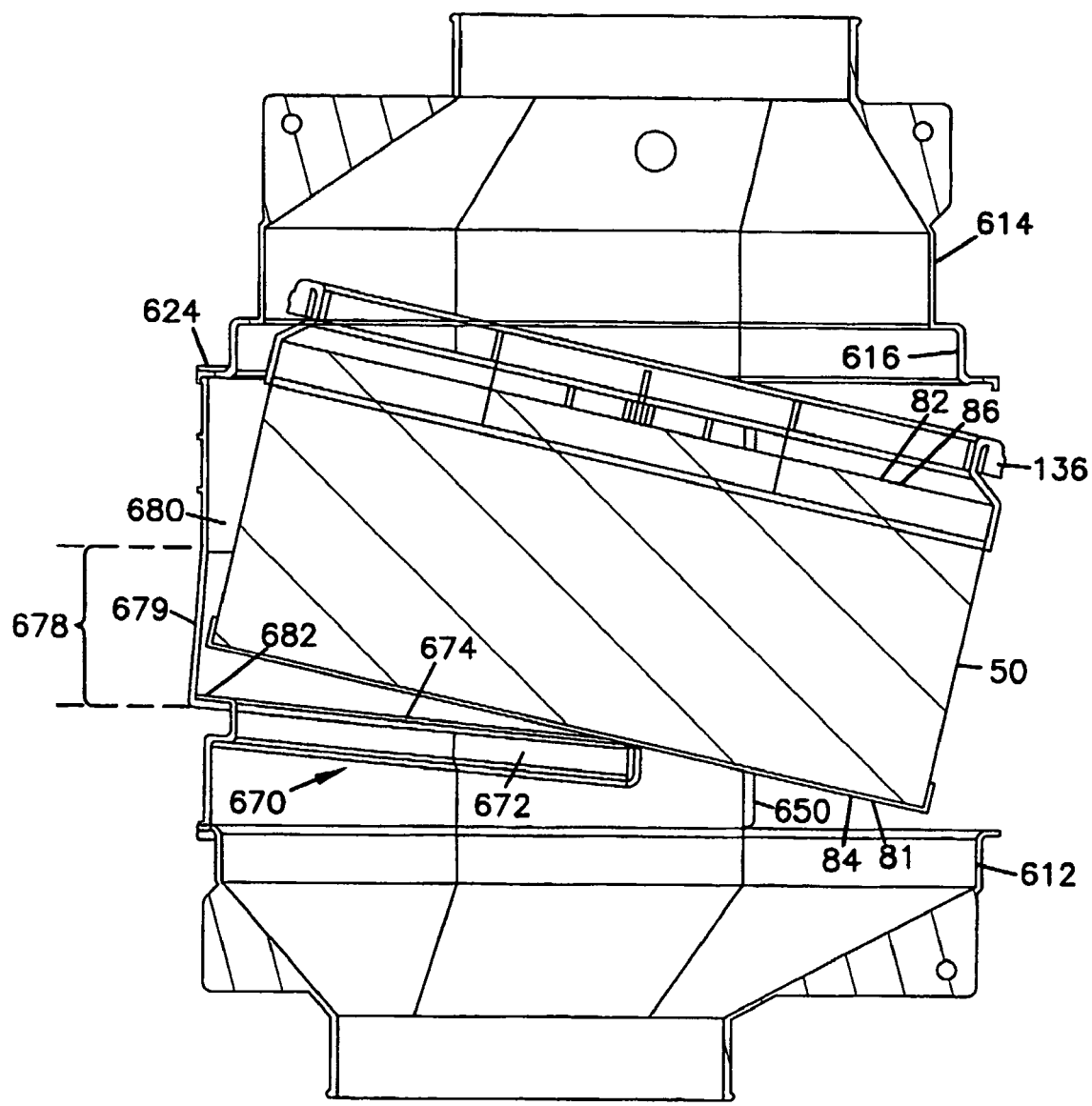
FIG. 41 is a schematic, cross-sectional view showing a further step of removing the filter element from the air cleaner housing of FIGS. 30-36.
Figure 42:
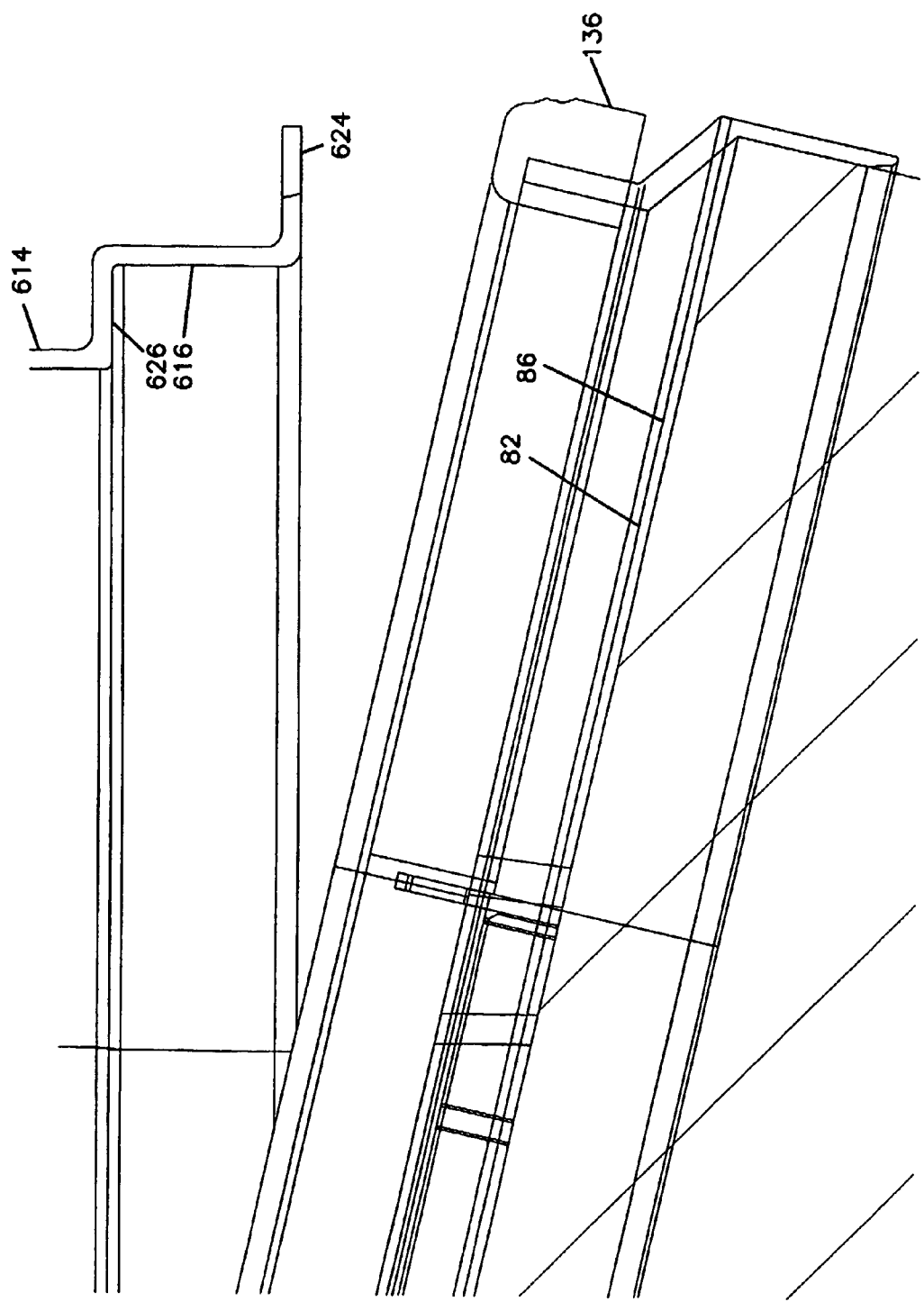
FIG. 42 is an enlarged portion of FIG. 41.

Attention is directed to FIGS. 30-32 and 37-43. One embodiment of the body member 610 is illustrated. The body member 610 includes a side wall 646. The side wall 646 is curved in a shape that generally corresponds to the shape of the filter element 50. In this case, the side wall 646 is U-shaped. As such, the side wall 646 includes a bight section forming a closed end 648 (FIG. 37) and a mouth or open end 650 (FIGS. 39 and 41). The open end 650 is sufficiently large enough to accommodate accepting the filter element 50 therethrough. The open end 650, in this embodiment, also corresponds to a side entry 652 (FIGS. 39 and 41). The side wall 646 also defines an inlet end 654, which is mounted adjacent to the inlet construction 612, and an outlet end 656, which is mounted adjacent to the outlet construction 614. Edges 658, 660 extend between the inlet end 654 and the outlet end 656. Note that edge 658 and edge 660 define the mouth or open end 650. The edges 658, 660 also interact with and engage the cover 52. Mounting flanges 661, 662, 663, 664 extend from the side wall 646. The mounting flanges 661, 662, 663, 664 each include a fastener arrangement for removably securing the cover 52 to the body member 610.

As with the embodiments of FIGS. 1-29, the air cleaner 606 also includes system 259 (FIG. 37) for operably mounting the filter element 50 within the body construction 606. As described above, the air cleaner system 259 is constructed and arranged to cam, tilt, or pivot the filter element 50 into sealing engagement with the housing 602. In this embodiment, the system 259 includes pivot region 630. The pivot region 630 accepts the force of the filter element 50 to be pushed against it and pivoted so that the radial seal 618 is formed in place by compression of the seal member 136 against the sealing surface 616. Further, to aid in installation of the filter element 50, the system 259 includes a slide mount 670 and a bump out region 678. The slide mount 670 enables the filter element 50 to be conveniently and smoothly inserted through the mouth or opening 650 and oriented to engage against the pivot region 630, as shown in FIG. 38.

A number of different implementations are possible. In the particular one illustrated, the slide mount 670 includes a ramp 672. The ramp 672 defines an angled slide surface 674. In the embodiment shown, the slide surface 674 is angled in a direction from the open end 650 to the closed end 648. The angle is in a direction such that when the filter element 50 is inserted through the side entry 652, the element is urged in a direction toward the sealing surface 616. In FIG. 37, it can be seen that the ramp 672 is highest or deepest at the closed end 648 than at the open end 650. In the embodiment shown, the ramp 672 forms a straight and continuous slide surface 674. As can be seen by comparing FIGS. 30, 31, 32, and 33, the ramp 672 is continuous about the side wall 646 from a position just short of the edge 658 to a position just short of the edge 660.

The ramp 672 provides surface 674 for engaging the filter element 50 in order to urge or push the filter element 50 in a direction toward the sealing surface 616. In the preferred embodiment shown, the ramp 672 has a slope of less than 30°, typically 2°-10°, and preferably 4°-6°, nominally 5°.

In preferred embodiments, the band 168 on the filter element 50 is provided to engage and slide against the slide surface 674 in order to urge the filter element 50 toward the sealing surface 616.

Attention is directed to FIGS. 37 and 41. In the particular embodiment illustrated, the ramp 672 includes a relief region 676. The relief region is a region of the ramp 672 that is angled away from the slide surface 674. The relief region 676 aids in removing the filter element 50 from the body construction 606 during servicing. In particular, the relief region 676 provides an area of clearance so that the element 50 can be dislodged from the body construction 606. By "dislodged", it is meant that the radial seal 618 is released. FIG. 41 shows the element 50 after the radial seal 618 has been released. The band 168 on the filter element 50 is engaged against the relief region 676. Methods of servicing the air cleaner 600 are discussed further below. In the embodiment shown, the relief region 676 has an angle of not greater than 50°, typically 5°-15°, preferably 80°-120°, and nominally 10°.

In the embodiment shown, the side wall 646 further includes a bump out region 678. The bump out region 678 is an area of the side wall 646 of increased volume. The bump out region 678 can be seen in FIGS. 30 and 31 as an area 679 of the side wall that is angled outwardly from the remaining portion of the side wall 646. In particular, the bump out region 678 can be seen in FIG. 31 as being wedge shaped starting at an area 680 at close to a midpoint of the side wall 646 and expanding outwardly until reaching the ramp 672. The bump out region 678 allows the seal member 138 of the filter element 50 to contact the sealing surface 616 and the stop surface 626 in order to then pivot the element 50 into operable, sealing engagement with the housing 602. (See FIG. 43)

As with the previous embodiments, the cover 608 (52) helps to support and keep the filter element 50 oriented in operable assembly seated with the radial seal 616 in place in the housing 602. As described previously, the cover 52 includes projection 304 that extends or projects toward the housing 602, when the cover 52 is operably mounted on the body member 610. In use, the cover 52 interacts with the element 50 as described in connection with the previous embodiment, FIG. 26. In particular, the projection 304 extends into and out of the recess 150 in the filter element 50.

After the filter element 50 is assembled into the body construction 606, the cover 52 is oriented over the exposed portion of the filter element 50 and mounted to the body member 610. If the filter element 50 is not properly seated within the housing 602 with the radial seal 618 formed, the cover 52 will be precluded or prevented from fitting or properly mounting to the body member 610. If the filter element 50 is properly mounted within the body construction 606, the cover 52 is guided to the proper mount by way of engagement between the band 168 and ledge 292. Further, the projection 304 will be received by the recess 150 in the filter element 50. Also, the mounting flanges 661, 662, 663, 664 will be matched up so that fasteners can be mounted therein.

G. Methods of Use, Installing And Servicing

To install the filter element 50 into the housing 602, the cover 52 is removed from the body construction 606 to expose the open end 650. Filter element 50 is oriented such that the second end 82 of the element 50 is adjacent to the outlet construction 614, while the first end 81 is oriented adjacent to the inlet construction 612. The band 168 is oriented such that it engages the ramp 672. The filter element 50 is slid along the slide mount 670. Engagement of the slide surface 674 against the band 168 moves the filter element 50 in a direction toward the outlet construction 614. Eventually, and with attention directed to FIG. 37, the band 168 slides into the bump out region 678 and engages corner 682. Corner 682 is the intersection of bump out region 678 and ramp 672. At the same time, the seal member 136 contacts the sealing surface 616 and the stop surface 626.

FIG. 38 shows an enlarged view of the element 50 relative to the body construction 606 during the insertion process. The pivot region 630 can be seen along the sealing surface 616. At this point in the insertion process, the exposed end of the filter element 50 has force applied upon it by the user. The user rocks, tilts, cams, or pivots the element 50 about the pivot region 630 in order to move the element 50 into operable, sealing engagement with the housing 602. This can be seen at FIG. 43. As part of this process, the filter element 50 is moved so that no portion of the element 50 is projecting into the bump out region 678. At this point, the seal member 136 should be in place forming the radial seal 618 against the sealing surface 616 (FIG. 43). The cover 52 is then oriented over the exposed portion of the filter element 50 so that the ledge 292 engages the band 168 to support the filter element 50, while the projection 304 extends into and is received by the recess 150 in the filter element 50. The cover 52 is then connected to the body member 610 at the interface between the mounting flanges 661, 662, 663, 664. The air cleaner 600 is then ready for filtering operation.

To use the air cleaner 600, dirty air passes through the intake region 35 (FIG. 1) into ducting, and eventually through the inlet duct 640 of the inlet construction 612. The air then flows to the filter element 50 and passes through the first flow face 84. The dirty air is then forced to flow through the filter media 80, where the air is at least partially cleaned of particulate material. The clean air exits the filter element 50 by flowing from the second flow face 86. From there, the clean air flows through the outlet construction 614 and through the outlet duct 622. The clean air is then used by equipment 32 such as internal combustion engine 33.

After a period of operation, the filter element 50 will become clogged or occluded with an unacceptably high level of restriction. Servicing of the air cleaner 600 will become necessary. By "servicing", it is meant removal of the filter element 50 and replacement with a new filter element 50.

To service the air cleaner 600, the cover 52 is removed from the housing 602 by removing fasteners between the mounting flanges 661, 662, 663, 664. The cover 52 is removed to expose the open end 650. The old filter element 50 is then removed from the housing 602 through the open end 650. This is done by, first, releasing or breaking the radial seal 618 between the filter element 50 and the housing 602. The seal 618 is released by holding the exposed edge of the filter element 50 and rocking, tilting, or camming the filter element 50 in a direction so that the inlet end 84 of the filter element 50 contacts the relief region 676 of the ramp 672. A portion of the element 50 is also then projecting into the bump out region 678. This is shown in FIG. 39. This motion releases the radial seal 618 from 30 the sealing surface 616. See FIG. 39, in which a portion of the seal member 136 is shown completely removed from and spaced from the seal surface 616. FIG. 41 shows a further step in the removal process. The element 50 is further pivoted about the relief region 676 to move the element 50 from corner 682 further into the bump out region 678. The remaining portion of the seal member 136 is removed from the sealing surface 616. This exposes the downstream face 86 of the filter element 50 and allows the user's hand to be inserted between the downstream face 86 of the element 50 and the outlet construction 614. The operator can then pull the element 50 from the housing 602.

The old filter element 50 is then disposed of. A second, new filter element 50 is provided. The new filter element 50 is installed in the air cleaner 600 by mounting it through the side entry 652 and sliding the element 50 along the slide mount 670, and then pivoting the element 50 about the pivot region 630 until the element is in operable assembly within the housing 602. The cover 52 is then placed over the exposed portion of the filter element 50 and secured to the body member 610.

What is claimed is:

1. An air cleaner comprising:
    (a) a housing having first and second opposite ends and a sidewall between said first and second ends; said sidewall defining an access opening; said sidewall having a slide mount; an access cover removal positioned over the access opening;
    (b) a filter element operably installed and sealed in the housing; the filter element having first and second opposite flow faces; the filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of said flutes being closed at the upstream portion and open at the downstream portion;
        (i) said housing being constructed and arranged to accept the filter element through the access opening in the sidewall and slide along the slide mount;
    (c) said sidewall defining a bump out region;
        (i) said housing being constructed and arranged to accept the filter element through the access opening in the sidewall, slide along the slide mount, and engage the bump out region; and
    (d) the housing including a pivot region about which the filter element can pivot when moving into and out of sealing engagement with the housing.

2. An air cleaner according to claim 1 wherein:
    (a) the bump out region includes a wedge-shaped area of volume defined by the sidewall expanding outwardly until reaching the slide mount.

3. An air cleaner according to claim wherein:
    (a) the bump out region is defined by a region of the sidewall starting at a midpoint of the side wall and expanding outwardly until reaching the slide mount.

4. An air cleaner according to claim 1 wherein:
    (a) said slide mount includes a ramp extending from the opening toward a closed portion of the housing.

5. An air cleaner according to claim 4 wherein:
    (a) the ramp has a slope of less than 30°.

6. An air cleaner according to claim 4 wherein:
    (a) the ramp has a slope of 2°-10°.

7. An air cleaner according to claim 4 wherein:
    (a) the ramp includes a slide surface and a relief region; the relief region being angled away from the slide surface.

8. An air cleaner according to claim 1 wherein:
    (a) the filter element includes a seal member and a frame construction; the frame construction having an extension projecting axially from the second flow face; the seal member being supported by the extension of the frame construction; the seal member forming a radial seal with the housing when the filter element is cammed into sealing engagement.

9. An air cleaner according to claim 1 wherein:
(a) said filter element includes a band around a periphery of the first flow face; and
(b) the access cover includes a ledge engaging the band to support the filter element.

10. An air cleaner according to claim 1 wherein:
(a) said side wall is curved in a shape that generally corresponds to the shape of the filter element.

11. An air cleaner according to claim 1 wherein:
(a) said side wall is curved in a U-shape including a bight section forming a closed end and a mouth sufficiently large enough to accommodate accepting the filter element therethrough.

12. A method of servicing an air cleaner; the air cleaner including: a housing having first and second opposite ends and a sidewall between the first and second ends; the sidewall defining an access opening; an access cover removably positioned over the access opening; and a filter element operably installed and sealed in the housing; the filter element having first and second opposite flow faces; the filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion; the housing being constructed and arranged to accept the filter element through the access opening in the sidewall; the method comprising:
(a) pushing the filter element against a pivot region in the housing to pivot the filter element about the pivot region and release a seal between the filter element and the housing; and
(b) after said step of pushing, removing the filter element through an opening in a side of the housing, and moving a portion of the filter element into a bump out region in the sidewall.

13. A method according to claim 12 wherein:
(a) said step of pushing the filter element against a pivot region in the housing to release a seal includes pushing the filter element against a pivot region defined by a sealing surface to releasing a radial seal between the filter element and housing.

14. A method according to claim 12 wherein:
(a) the step of moving a portion of the filter element into a bump out region in the sidewall includes moving a portion of the filter element into a wedge-shaped area of volume defined by the sidewall expanding outwardly until a slide mount.

15. A method according to claim 14 further including:
(a) after said step of removing, providing a second filter element and installing the second filter element in the housing;
  (i) the second filter element having first and second opposite flow faces; the second filter element including media having a plurality of flutes; each of the flutes having an upstream portion adjacent to the first flow face and a downstream portion adjacent to the second flow face; selected ones of the flutes being open at the upstream portion and closed at the downstream portion; and selected ones of said flutes being closed at the upstream portion and open at the downstream portion.

16. A method according to claim 15 wherein:
(a) the housing includes a ramp; and
(b) said step of installing includes sliding a portion of the second filter element against the ramp.

17. A method according to claim 12 further including:
(a) before said step of pushing, removing the access cover from the housing to expose the access opening in the side of the housing.

18. A method according to claim 17 further including:
(a) after said step of installing, placing a cover over the opening in the housing.

19. A method of installing a filter element into an air cleaner; the air cleaner including: a housing having first and second opposite ends and a sidewall between the first and second ends; the sidewall defining an access opening; the sidewall defining a ramp; an access cover removably positioned over the access opening; the filter element including first and second opposite flow faces, media having a plurality of flutes; each of the flutes having an upstream portion adjacent to the first flow face and a downstream portion adjacent to the second flow face; selected ones of the flutes being open at the upstream portion and closed at the downstream portion; and selected ones of the flutes being closed at the upstream portion and open at the downstream portion; the housing being constructed and arranged to accept the filter element through the access opening in the sidewall; the method comprising:
(a) sliding the filter element along the ramp into a bump out region;
(b) contacting a seal member on the filter element against a pivot region on the housing; and
(c) applying force to an exposed portion of the filter element and pivoting the element about the pivot region to move the seal member into sealing engagement with the housing.

20. A method according to claim 19 wherein:
(a) the filter element has a band around the periphery of the first flow face; and the step of sliding the filter element includes engaging the band against the ramp and sliding the filter element along the ramp in the bump out region.

21. A method according to claim 20 wherein:
(a) the step of sliding the filter element with the band into a bump out region includes sliding the filter element with the band until the band engages a corner of the housing.

22. A method according to claim 20 further comprising:
(a) after the step of applying force and pivoting, orienting the access cover over the filter element to engage a ledge on the cover with the band on the filter element.

23. A method according to claim 19 wherein:
(a) the step of applying force and pivoting includes pivoting the element about the pivot region to form a radial seal with the housing.

24. A method according to claim 19 wherein:
(a) the step of applying force and pivoting includes pivoting the element about the pivot region to move the filter element so that no portion of the filter element is projecting into the bump out region.

* * * * *

UNITED STATES PATENT AND TRADEMARK OFFICE
CERTIFICATE OF CORRECTION

PATENT NO. : 7,655,074 B2 Page 1 of 1
APPLICATION NO. : 10/578636
DATED : February 2, 2010
INVENTOR(S) : Nepsund et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 373 days Delete the phrase "by 373 days" and insert --by 534 days--

In the Specification:

Col. 1, line 4: insert --This application is a National Stage Application of PCT/US2004/037570, filed November 10, 2004, which is the International Application of Serial No. 60/519,574, filed November 12, 2003 and which application(s) are incorporated herein by reference. A claim of priority to both, to the PCT/US/2004/037570 and 60/519,574 applications is made.-- as follows Col. 16, line 6: "at least 50 cfm an air" should read --at least 50 cfm and an air--

Col. 18, line 24: "preferably 80°-120°, and" should read --preferably 8°-12°, and--

Signed and Sealed this

Twenty-fourth Day of August, 2010

David J. Kappos
*Director of the United States Patent and Trademark Office*